(12) United States Patent
Stevenson et al.

(10) Patent No.: US 6,473,456 B1
(45) Date of Patent: Oct. 29, 2002

(54) DATA ACQUISITION SENSOR AND METHOD OF SIGNALING

(76) Inventors: Roy A. Stevenson, deceased, late of Glendale, CA (US); by Pauline Beebe, executrix, 429 Cumberland Rd., Glendale, CA (US) 91202

( * ) Notice: Subject to any disclaimer, the term of this patent is extended or adjusted under 35 U.S.C. 154(b) by 0 days.

(21) Appl. No.: 09/245,121

(22) Filed: Feb. 4, 1999

(Under 37 CFR 1.47)

Related U.S. Application Data

(60) Provisional application No. 60/074,267, filed on Feb. 10, 1998.

(51) Int. Cl.[7] .............................. H03K 7/08; H03K 7/04

(52) U.S. Cl. ....................................... 375/238; 325/239

(58) Field of Search ................................. 375/238, 259, 375/295, 239; 329/312; 327/31

(56) References Cited

U.S. PATENT DOCUMENTS

| | | | | |
|---|---|---|---|---|
| 4,188,581 A | * | 2/1980 | Stevenson | 375/238 |
| 4,584,691 A | * | 4/1986 | Herr | 375/238 |
| 5,588,023 A | * | 12/1996 | Ho | 375/238 |
| 5,661,758 A | * | 8/1997 | Long | 375/296 |

* cited by examiner

*Primary Examiner*—Chi Pham
*Assistant Examiner*—Khai Tran
(74) *Attorney, Agent, or Firm*—John E. Wagner

(57) ABSTRACT

A coding system for data and a demultiplexer and decoder forming an interface for a computer is disclosed. Both are improvements upon the system disclosed and claims in U.S. Pat. No. 4,188,581 of this inventor. Improvements include the use of a RC differentiator in combination with a diode for introducing coded data into a reflective terminated tapped delay line. Data is coded in the form of the time duration between two successive pulses in discrete increments. One feature involves the use of the second of two pulses to define the end of one character and the beginning of the next character. Multiple code banks allow a variety of data rates.

10 Claims, 31 Drawing Sheets

NOTE: Move decimal point to the left for PICO seconds and to the right for MICRO, MILLI, SECONDS, etc

CODE BANK #1

CODE ↓

C·O·D·E·S
N-ary

ANALOG OR DIGITAL
SERIAL OR BURST

BINARY • MNEMONICS •
ALPHANUMERICS

- Time in Nanoseconds -

Parameters #3

BINARY ········ 25 35 45 55 65 — A 35 45 55 65 75 85 95 — B 45 55 65 75 85 95 105 115 125 -- C 55 65 75 85 95 105 115 125 135 145 155 ---- D 65 75 85 95 105 115 125 135 145 155 165 175 185 ------ E 75 85 95 105 115 125 135 145 155 165 175 185 195 205 215 -------- F 85 95 105 115 125 135 145 155 165 175 185 195 205 215 225 235 245 -------- G 95 105 115 125 135 145 155 165 175 185 195 205 215 225 235 245 255 265 275  Hex ------- H 105 115 125 135 145 155 165 175 185 195 205 215 225 235 245 255 265 275 285 295 305  Octal --- I 115 125 135 145 155 165 175 185 195 205 215 225 235 245 255 265 275 285 295 305 315 325 335 --------- J 125 135 145 155 165 175 185 195 205 215 225 235 245 255 265 275 285 295 305 315 325 335 345 355 365 --------- K

| FIGURE 1 | FIGURE 4 | FIGURE 5 |
| --- | --- | --- |
| FIGURE 2 FIGURE 3 | | |

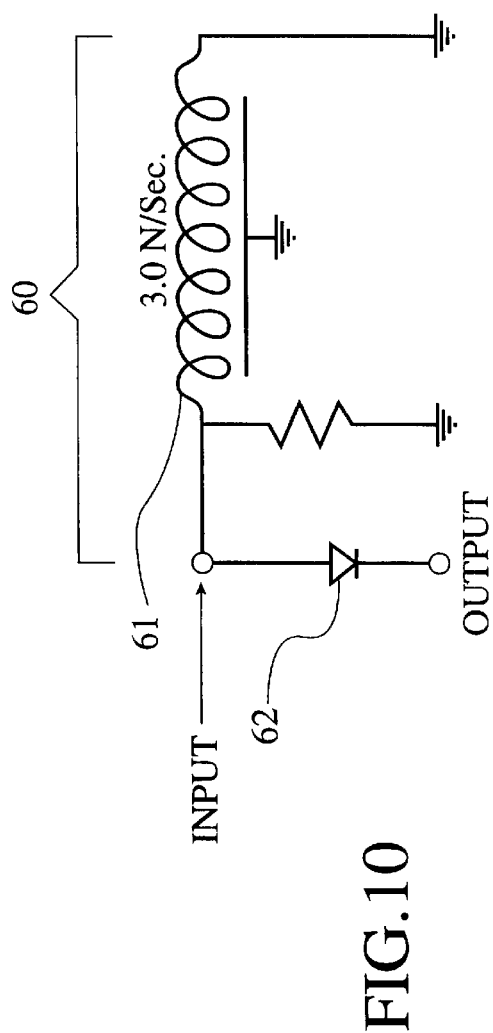
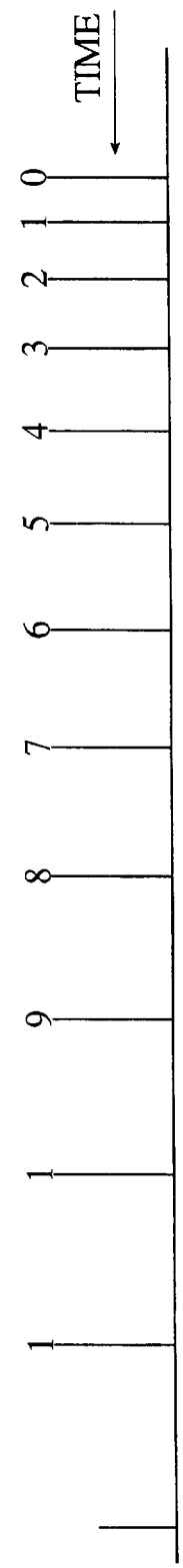
FIG.10
FIG.11

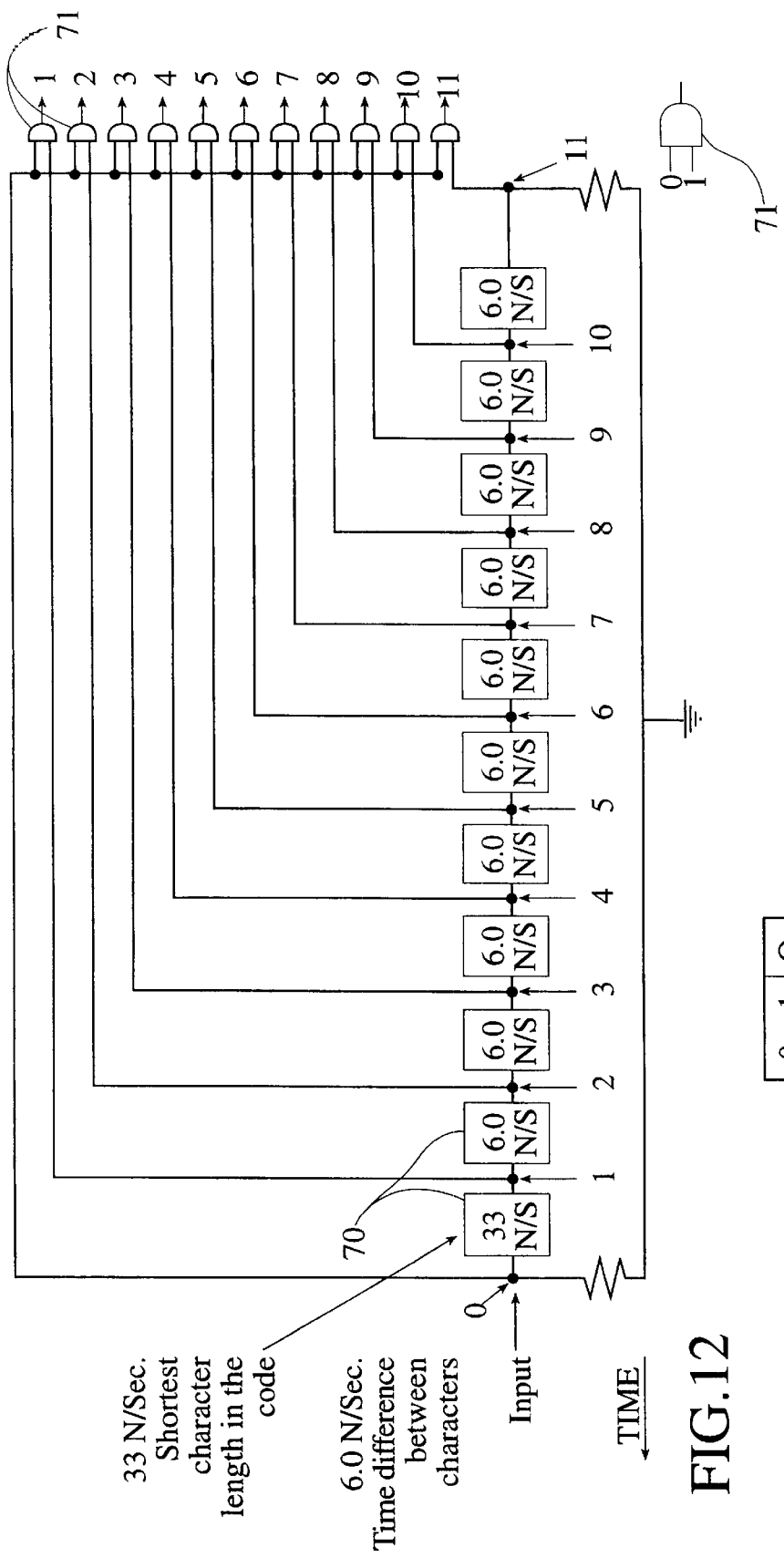

FIG. 14

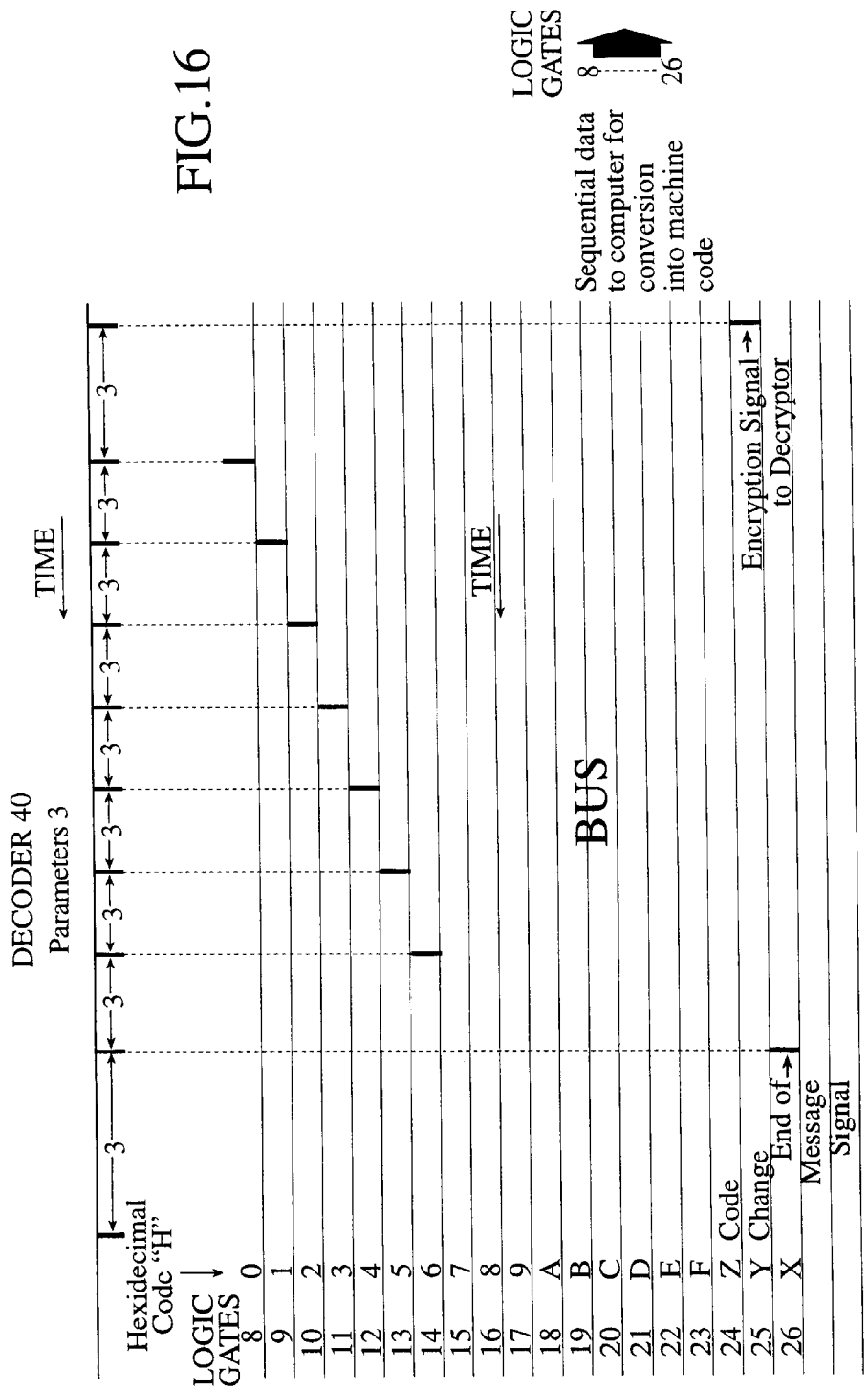

```
Ā→  10.  10.  10.  10.  10.  10.  10.  10.  10.  10.  10.  10.  10.  10.
CODE→ A    B    C    D    E    F    G    H    I    J    K    L    M    N
      25   35   45   55   65   75   85   95  105  115  125  135  145  155
      35   45   55   65   75   85   95  105  115  125  135  145  155  165
      45   55   65   75   85   95  105  115  125  135  145  155  165  175
      55   65   75   85   95  105  115  125  135  145  155  165  175  185
      65   75   85   95  105  115  125  135  145  155  165  175  185  195
           85   95  105  115  125  135  145  155  165  175  185  195  205
      (5)  95  105  115  125  135  145  155  165  175  185  195  205  215
               115  125  135  145  155  165  175  185  195  205  215  225
           (7) 125  135  145  155  165  175  185  195  205  215  225  235
                    145  155  165  175  185  195  205  215  225  235  245
                (9) 155  165  175  185  195  205  215  225  235  245  255
                         175  185  195  205  215  225  235  245  255  265
                   (11)  185  195  205  215  225  235  245  255  265  275
                              205  215  225  235  245  255  265  275  285
                        (13)  215  225  235  245  255  265  275  285  295
                                   235  245  255  265  275  285  295  305
                             (15)  245  255  265  275  285  295  305  315
                                        265  275  285  295  305  315  325
                                  (17)  275  285  295  305  315  325  335
                                             295  305  315  325  335  345
                                       (19)  305  315  325  335  345  355
                                                  325  335  345  355  365
                                            (21)  335  345  355  365  375
                                                       355  365  375  385
                                                 (23)  365  375  385  395
                                                            385  395  405
                                                      (25)  395  405  415
                                                                 415  425
                                                           (27)  425  435
                                                                      445
                                                                (29)  455
                                                                      (31)
```

CODE BANK #1

Parameters #3

Time in Nanoseconds

FIG.17A to FIG.17B →

| 10. | 10. | 10. | 10. | 10. | 10. | 10. | 10. | 10. |
|---|---|---|---|---|---|---|---|---|
| O | P | Q | R | S | T | U | V | W |
| 165 | 175 | 185 | 195 | 205 | 215 | 225 | 235 | 245 |
| 175 | 185 | 195 | 205 | 215 | 225 | 235 | 245 | 255 |
| 185 | 195 | 205 | 215 | 225 | 235 | 245 | 255 | 265 |
| 195 | 205 | 215 | 225 | 235 | 245 | 255 | 265 | 275 |
| 205 | 215 | 225 | 235 | 245 | 255 | 265 | 275 | 285 |
| 215 | 225 | 235 | 245 | 255 | 265 | 275 | 285 | 295 |
| 225 | 235 | 245 | 255 | 265 | 275 | 285 | 295 | 305 |
| 235 | 245 | 255 | 265 | 275 | 285 | 295 | 305 | 315 |
| 245 | 255 | 265 | 275 | 285 | 295 | 305 | 315 | 325 |
| 255 | 265 | 275 | 285 | 295 | 305 | 315 | 325 | 335 |
| 265 | 275 | 285 | 295 | 305 | 315 | 325 | 335 | 345 |
| 275 | 285 | 295 | 305 | 315 | 325 | 335 | 345 | 355 |
| 285 | 295 | 305 | 315 | 325 | 335 | 345 | 355 | 365 |
| 295 | 305 | 315 | 325 | 335 | 345 | 355 | 365 | 375 |
| 305 | 315 | 325 | 335 | 345 | 355 | 365 | 375 | 385 |
| 315 | 325 | 335 | 345 | 355 | 365 | 375 | 385 | 395 |
| 325 | 335 | 345 | 355 | 365 | 375 | 385 | 395 | 405 |
| 335 | 345 | 355 | 365 | 375 | 385 | 395 | 405 | 415 |
| 345 | 355 | 365 | 375 | 385 | 395 | 405 | 415 | 425 |
| 355 | 365 | 375 | 385 | 395 | 405 | 415 | 425 | 435 |
| 365 | 375 | 385 | 395 | 405 | 415 | 425 | 435 | 445 |
| 375 | 385 | 395 | 405 | 415 | 425 | 435 | 445 | 455 |
| 385 | 395 | 405 | 415 | 425 | 435 | 445 | 455 | 465 |
| 395 | 405 | 415 | 425 | 435 | 445 | 455 | 465 | 475 |
| 405 | 415 | 425 | 435 | 445 | 455 | 465 | 475 | 485 |
| 415 | 425 | 435 | 445 | 455 | 465 | 475 | 485 | 495 |
| 425 | 435 | 445 | 455 | 465 | 475 | 485 | 495 | 505 |
| 435 | 445 | 455 | 465 | 475 | 485 | 495 | 505 | 515 |
| 445 | 455 | 465 | 475 | 485 | 495 | 505 | 515 | 525 |
| 455 | 465 | 475 | 485 | 495 | 505 | 515 | 525 | 535 |
| 465 | 475 | 485 | 495 | 505 | 515 | 525 | 535 | 545 |
| 475 | 485 | 495 | 505 | 515 | 525 | 535 | 545 | 555 |
| 485 | 495 | 505 | 515 | 525 | 535 | 545 | 555 | 565 |
| | | 505 | 515 | 525 | 535 | 545 | 555 | 565 | 575 |
| (33) | 515 | 525 | 535 | 545 | 555 | 565 | 575 | 585 |
| | | 535 | 545 | 555 | 565 | 575 | 585 | 595 |
| | (35) | 545 | 555 | 565 | 575 | 585 | 595 | 605 |
| | | | 565 | 575 | 585 | 595 | 605 | 615 |
| | | (37) | 575 | 585 | 595 | 605 | 615 | 625 |
| | | | | 595 | 605 | 615 | 625 | 635 |
| | | | (39) | 605 | 615 | 625 | 635 | 645 |
| | | | | | 625 | 635 | 645 | 655 |
| | | | | (41) | 635 | 645 | 655 | 665 |
| | | | | | | 655 | 665 | 675 |
| | | | | | (43) | 665 | 675 | 685 |
| | | | | | | | 685 | 695 |
| | | | | | | (45) | 695 | 705 |
| | | | | | | | | 715 |
| | | | | | | | (47) | 725 |
| | | | | | | | | (49) | to FIG.17A ←

FIG.17B

| Ā → | 8.0 | 8.0 | 8.0 | 8.0 | 8.0 | 8.0 | 8.0 | 8.0 | 8.0 | 8.0 | 8.0 | 8.0 | 8.0 | 8.0 |
|---|---|---|---|---|---|---|---|---|---|---|---|---|---|---|
| CODE → | A | B | C | D | E | F | G | H | I | J | K | L | M | N |
| | 20 | 28 | 36 | 44 | 52 | 60 | 68 | 76 | 84 | 92 | 100 | 108 | 116 | 124 |
| | 28 | 36 | 44 | 52 | 60 | 68 | 76 | 84 | 92 | 100 | 108 | 116 | 124 | 132 |
| | 36 | 44 | 52 | 60 | 68 | 76 | 84 | 92 | 100 | 108 | 116 | 124 | 132 | 140 |
| | 44 | 52 | 60 | 68 | 76 | 84 | 92 | 100 | 108 | 116 | 124 | 132 | 140 | 148 |
| | 52 | 60 | 68 | 76 | 84 | 92 | 100 | 108 | 116 | 124 | 132 | 140 | 148 | 156 |
| | | 68 | 76 | 84 | 92 | 100 | 108 | 116 | 124 | 132 | 140 | 148 | 156 | 164 |
| | (5) | 76 | 84 | 92 | 100 | 108 | 116 | 124 | 132 | 140 | 148 | 156 | 164 | 172 |
| | | | 92 | 100 | 108 | 116 | 124 | 132 | 140 | 148 | 156 | 164 | 172 | 180 |
| | | (7) | 100 | 108 | 116 | 124 | 132 | 140 | 148 | 156 | 164 | 172 | 180 | 188 |
| | | | | 116 | 124 | 132 | 140 | 148 | 156 | 164 | 172 | 180 | 188 | 196 |
| | | | (9) | 124 | 132 | 140 | 148 | 156 | 164 | 172 | 180 | 188 | 196 | 204 |
| | | | | | 140 | 148 | 156 | 164 | 172 | 180 | 188 | 196 | 204 | 212 |
| | | | | (11) | 148 | 156 | 164 | 172 | 180 | 188 | 196 | 204 | 212 | 220 |
| | | | | | | 164 | 172 | 180 | 188 | 196 | 204 | 212 | 220 | 228 |
| | | | | | (13) | 172 | 180 | 188 | 196 | 204 | 212 | 220 | 228 | 236 |
| | | | | | | | 188 | 196 | 204 | 212 | 220 | 228 | 236 | 244 |
| | | | | | | (15) | 196 | 204 | 212 | 220 | 228 | 236 | 244 | 252 |
| | | | | | | | | 212 | 220 | 228 | 236 | 244 | 252 | 260 |
| | | | | | | | (17) | 220 | 228 | 236 | 244 | 252 | 260 | 268 |
| | | | | | | | | | 236 | 244 | 252 | 260 | 268 | 276 |
| | | | | | | | | (19) | 244 | 252 | 260 | 268 | 276 | 284 |
| | | | | | | | | | | 260 | 268 | 276 | 284 | 292 |
| | | | | | | | | | (21) | 268 | 276 | 284 | 292 | 300 |
| | | | | | | | | | | | 284 | 292 | 300 | 308 |
| | | | | | | | | | | (23) | 292 | 300 | 308 | 316 |
| | | | | | | | | | | | | 308 | 316 | 324 |
| | | | | | | | | | | | (25) | 316 | 324 | 332 |
| | | | | | | | | | | | | | 332 | 340 |
| | | | | | | | | | | | | (27) | 340 | 348 |
| | | | | | | | | | | | | | | 356 |
| | | | | | | | | | | | | | (29) | 364 |

CODE BANK #2

Parameters #3 (31)

Time in Nanoseconds to FIG.18B →

FIG.18A

|   | 8.0 | 8.0 | 8.0 | 8.0 | 8.0 | 8.0 | 8.0 | 8.0 | 8.0 |
|---|---|---|---|---|---|---|---|---|---|
|   | O | P | Q | R | S | T | U | V | W |
|   | 132 | 140 | 148 | 156 | 164 | 172 | 180 | 188 | 196 |
|   | 140 | 148 | 156 | 164 | 172 | 180 | 188 | 196 | 204 |
|   | 148 | 156 | 164 | 172 | 180 | 188 | 196 | 204 | 212 |
|   | 156 | 164 | 172 | 180 | 188 | 196 | 204 | 212 | 220 |
|   | 164 | 172 | 180 | 188 | 196 | 204 | 212 | 220 | 228 |
|   | 172 | 180 | 188 | 196 | 204 | 212 | 220 | 228 | 236 |
|   | 180 | 188 | 196 | 204 | 212 | 220 | 228 | 236 | 244 |
|   | 188 | 196 | 204 | 212 | 220 | 228 | 236 | 244 | 252 |
|   | 196 | 204 | 212 | 220 | 228 | 236 | 244 | 252 | 260 |
|   | 204 | 212 | 220 | 228 | 236 | 244 | 252 | 260 | 268 |
|   | 212 | 220 | 228 | 236 | 244 | 252 | 260 | 268 | 276 |
|   | 220 | 228 | 236 | 244 | 252 | 260 | 268 | 276 | 284 |
|   | 228 | 236 | 244 | 252 | 260 | 268 | 276 | 284 | 292 |
|   | 236 | 244 | 252 | 260 | 268 | 276 | 284 | 292 | 300 |
|   | 244 | 252 | 260 | 268 | 276 | 284 | 292 | 300 | 308 |
|   | 252 | 260 | 268 | 276 | 284 | 292 | 300 | 308 | 316 |
|   | 260 | 268 | 276 | 284 | 292 | 300 | 308 | 316 | 324 |
|   | 268 | 276 | 284 | 292 | 300 | 308 | 316 | 324 | 332 |
|   | 276 | 284 | 292 | 300 | 308 | 316 | 324 | 332 | 340 |
|   | 284 | 292 | 300 | 308 | 316 | 324 | 332 | 340 | 348 |
|   | 292 | 300 | 308 | 316 | 324 | 332 | 340 | 348 | 356 |
|   | 300 | 308 | 316 | 324 | 332 | 340 | 348 | 356 | 364 |
|   | 308 | 316 | 324 | 332 | 340 | 348 | 356 | 364 | 372 |
|   | 316 | 324 | 332 | 340 | 348 | 356 | 364 | 372 | 380 |
|   | 324 | 332 | 340 | 348 | 356 | 364 | 372 | 380 | 388 |
|   | 332 | 340 | 348 | 356 | 364 | 372 | 380 | 388 | 396 |
|   | 340 | 348 | 356 | 364 | 372 | 380 | 388 | 396 | 404 |
|   | 348 | 356 | 364 | 372 | 380 | 388 | 396 | 404 | 412 |
|   | 356 | 364 | 372 | 380 | 388 | 396 | 404 | 412 | 420 |
|   | 364 | 372 | 380 | 388 | 396 | 404 | 412 | 420 | 428 |
|   | 372 | 380 | 388 | 396 | 404 | 412 | 420 | 428 | 436 |
|   | 380 | 388 | 396 | 404 | 412 | 420 | 428 | 436 | 444 |
|   | 388 | 396 | 404 | 412 | 420 | 428 | 436 | 444 | 452 |
|   |   | 404 | 412 | 420 | 428 | 436 | 444 | 452 | 460 |
|   | (33) | 412 | 420 | 428 | 436 | 444 | 452 | 460 | 468 |
|   |   |   | 428 | 436 | 444 | 452 | 460 | 468 | 476 |
|   |   | (35) | 436 | 444 | 452 | 460 | 468 | 476 | 484 |
|   |   |   |   | 452 | 460 | 468 | 476 | 484 | 492 |
|   |   |   | (37) | 460 | 468 | 476 | 484 | 492 | 500 |
|   |   |   |   |   | 476 | 484 | 492 | 500 | 508 |
|   |   |   |   | (39) | 484 | 492 | 500 | 508 | 516 |
|   |   |   |   |   |   | 500 | 508 | 516 | 524 |
|   |   |   |   |   | (41) | 508 | 516 | 524 | 532 |
|   |   |   |   |   |   |   | 524 | 532 | 540 |
|   |   |   |   |   |   | (43) | 532 | 540 | 548 |
|   |   |   |   |   |   |   |   | 548 | 556 |
|   |   |   |   |   |   |   | (45) | 556 | 564 |
|   |   |   |   |   |   |   |   |   | 572 |
|   |   |   |   |   |   |   |   | (47) | 580 | to FIG.18A ←

FIG.18B (49)

```
A →   6.0  6.0  6.0  6.0  6.0  6.0  6.0  6.0  6.0  6.0  6.0  6.0  6.0  6.0
CODE→  A    B    C    D    E    F    G    H    I    J    K    L    M    N
       15   21   27   33   39   45   51   57   63   69   75   81   87   93
       21   27   33   39   45   51   57   63   69   75   81   87   93   99
       27   33   39   45   51   57   63   69   75   81   87   93   99  105
       33   39   45   51   57   63   69   75   81   87   93   99  105  111
       39   45   51   57   63   69   75   81   87   93   99  105  111  117
            51   57   63   69   75   81   87   93   99  105  111  117  123
      (5)   57   63   69   75   81   87   93   99  105  111  117  123  129
                 69   75   81   87   93   99  105  111  117  123  129  135
            (7)  75   81   87   93   99  105  111  117  123  129  135  141
                      87   93   99  105  111  117  123  129  135  141  147
                 (9)  93   99  105  111  117  123  129  135  141  147  153
                          105  111  117  123  129  135  141  147  153  159
                     (11) 111  117  123  129  135  141  147  153  159  165
                               123  129  135  141  147  153  159  165  171
                          (13) 129  135  141  147  153  159  165  171  177
                                    141  147  153  159  165  171  177  183
                               (15) 147  153  159  165  171  177  183  189
                                         159  165  171  177  183  189  195
                                    (17) 165  171  177  183  189  195  201
                                              177  183  189  195  201  207
                                         (19) 183  189  195  201  207  213
                                                   195  201  207  213  219
                                              (21) 201  207  213  219  225
                                                        213  219  225  231
                                                   (23) 219  225  231  237
                                                             231  237  243
                                                        (25) 237  243  249
                                                                  249  255
                                                             (27) 255  261
                                                                       267
                                                                  (29) 273
```

CODE BANK #3

Parameters #3                                                                                 (31)

Time in Nanoseconds to FIG.19B →

FIG.19A

| 6.0 | 6.0 | 6.0 | 6.0 | 6.0 | 6.0 | 6.0 | 6.0 | 6.0 |
|---|---|---|---|---|---|---|---|---|
| O | P | Q | R | S | T | U | V | W |
| 99 | 105 | 111 | 117 | 123 | 129 | 135 | 141 | 147 |
| 105 | 111 | 117 | 123 | 129 | 135 | 141 | 147 | 153 |
| 111 | 117 | 123 | 129 | 135 | 141 | 147 | 153 | 159 |
| 117 | 123 | 129 | 135 | 141 | 147 | 153 | 159 | 165 |
| 123 | 129 | 135 | 141 | 147 | 153 | 159 | 165 | 171 |
| 129 | 135 | 141 | 147 | 153 | 159 | 165 | 171 | 177 |
| 135 | 141 | 147 | 153 | 159 | 165 | 171 | 177 | 183 |
| 141 | 147 | 153 | 159 | 165 | 171 | 177 | 183 | 189 |
| 147 | 153 | 159 | 165 | 171 | 177 | 183 | 189 | 195 |
| 153 | 159 | 165 | 171 | 177 | 183 | 189 | 195 | 201 |
| 159 | 165 | 171 | 177 | 183 | 189 | 195 | 201 | 207 |
| 165 | 171 | 177 | 183 | 189 | 195 | 201 | 207 | 213 |
| 171 | 177 | 183 | 189 | 195 | 201 | 207 | 213 | 219 |
| 177 | 183 | 189 | 195 | 201 | 207 | 213 | 219 | 225 |
| 183 | 189 | 195 | 201 | 207 | 213 | 219 | 225 | 231 |
| 189 | 195 | 201 | 207 | 213 | 219 | 225 | 231 | 237 |
| 195 | 201 | 207 | 213 | 219 | 225 | 231 | 237 | 243 |
| 201 | 207 | 213 | 219 | 225 | 231 | 237 | 243 | 249 |
| 207 | 213 | 219 | 225 | 231 | 237 | 243 | 249 | 255 |
| 213 | 219 | 225 | 231 | 237 | 243 | 249 | 255 | 261 |
| 219 | 225 | 231 | 237 | 243 | 249 | 255 | 261 | 267 |
| 225 | 231 | 237 | 243 | 249 | 255 | 261 | 267 | 273 |
| 231 | 237 | 243 | 249 | 255 | 261 | 267 | 273 | 279 |
| 237 | 243 | 249 | 255 | 261 | 267 | 273 | 279 | 285 |
| 243 | 249 | 255 | 261 | 267 | 273 | 279 | 285 | 291 |
| 249 | 255 | 261 | 267 | 273 | 279 | 285 | 291 | 297 |
| 255 | 261 | 267 | 273 | 279 | 285 | 291 | 297 | 303 |
| 261 | 267 | 273 | 279 | 285 | 291 | 297 | 303 | 309 |
| 267 | 273 | 279 | 285 | 291 | 297 | 303 | 309 | 315 |
| 273 | 279 | 285 | 291 | 297 | 303 | 309 | 315 | 321 |
| 279 | 285 | 291 | 297 | 303 | 309 | 315 | 321 | 327 |
| 285 | 291 | 297 | 303 | 309 | 315 | 321 | 327 | 333 |
| 291 | 297 | 303 | 309 | 315 | 321 | 327 | 333 | 339 |
|  |  | 303 | 309 | 315 | 321 | 327 | 333 | 339 | 345 |
| (33) | 309 | 315 | 321 | 327 | 333 | 339 | 345 | 351 |
|  |  | 321 | 327 | 333 | 339 | 345 | 351 | 357 |
|  | (35) | 327 | 333 | 339 | 345 | 351 | 357 | 363 |
|  |  |  | 339 | 345 | 351 | 357 | 363 | 369 |
|  |  | (37) | 345 | 351 | 357 | 363 | 369 | 375 |
|  |  |  |  | 357 | 363 | 369 | 375 | 381 |
|  |  |  | (39) | 363 | 369 | 375 | 381 | 387 |
|  |  |  |  | 375 | 381 | 387 | 393 |
|  |  |  | (41) | 381 | 387 | 393 | 399 |
|  |  |  |  |  | 393 | 399 | 405 |
|  |  |  |  | (43) | 399 | 405 | 411 |
|  |  |  |  |  |  | 411 | 417 |
|  |  |  |  |  | (45) | 417 | 423 |
|  |  |  |  |  |  |  | 429 |
|  |  |  |  |  |  | (47) | 435 |
|  |  |  |  |  |  |  | (49) | to FIG.19A ←

CODE BANK #4

Parameters #3

Time in Nanoseconds

| Ā → | 4.0 | 4.0 | 4.0 | 4.0 | 4.0 | 4.0 | 4.0 | 4.0 | 4.0 | 4.0 | 4.0 | 4.0 | 4.0 |
|---|---|---|---|---|---|---|---|---|---|---|---|---|---|
| CODE → | A | B | C | D | E | F | G | H | I | J | K | L | M |
|  | 10 | 14 | 18 | 22 | 26 | 30 | 34 | 38 | 42 | 46 | 50 | 54 | 58 |
|  | 14 | 18 | 22 | 26 | 30 | 34 | 38 | 42 | 46 | 50 | 54 | 58 | 62 |
|  | 18 | 22 | 26 | 30 | 34 | 38 | 42 | 46 | 50 | 54 | 58 | 62 | 66 |
|  | 22 | 26 | 30 | 34 | 38 | 42 | 46 | 50 | 54 | 58 | 62 | 66 | 70 |
|  | 26 | 30 | 34 | 38 | 42 | 46 | 50 | 54 | 58 | 62 | 66 | 70 | 74 |
|  |  | 34 | 38 | 42 | 46 | 50 | 54 | 58 | 62 | 66 | 70 | 74 | 78 |
|  | (5) | 38 | 42 | 46 | 50 | 54 | 58 | 62 | 66 | 70 | 74 | 78 | 82 |
|  |  |  | 46 | 50 | 54 | 58 | 62 | 66 | 70 | 74 | 78 | 82 | 86 |
|  |  | (7) | 50 | 54 | 58 | 62 | 66 | 70 | 74 | 78 | 82 | 86 | 90 |
|  |  |  |  | 58 | 62 | 66 | 70 | 74 | 78 | 82 | 86 | 90 | 94 |
|  |  |  | (9) | 62 | 66 | 70 | 74 | 78 | 82 | 86 | 90 | 94 | 98 |
|  |  |  |  |  | 70 | 74 | 78 | 82 | 86 | 90 | 94 | 98 | 102 |
|  |  |  |  | (11) | 74 | 78 | 82 | 86 | 90 | 94 | 98 | 102 | 106 |
|  |  |  |  |  |  | 82 | 86 | 90 | 94 | 98 | 102 | 106 | 110 |
|  |  |  |  |  | (13) | 86 | 90 | 94 | 98 | 102 | 106 | 110 | 114 |
|  |  |  |  |  |  |  | 94 | 98 | 102 | 106 | 110 | 114 | 118 |
|  |  |  |  |  |  | (15) | 98 | 102 | 106 | 110 | 114 | 118 | 122 |
|  |  |  |  |  |  |  |  | 106 | 110 | 114 | 118 | 122 | 126 |
|  |  |  |  |  |  |  | (17) | 110 | 114 | 118 | 122 | 126 | 130 |
|  |  |  |  |  |  |  |  |  | 118 | 122 | 126 | 130 | 134 |
|  |  |  |  |  |  |  |  | (19) | 122 | 126 | 130 | 134 | 138 |
|  |  |  |  |  |  |  |  |  |  | 130 | 134 | 138 | 142 |
|  |  |  |  |  |  |  |  |  | (21) | 134 | 138 | 142 | 146 |
|  |  |  |  |  |  |  |  |  |  |  | 142 | 146 | 150 |
|  |  |  |  |  |  |  |  |  |  | (23) | 146 | 150 | 154 |
|  |  |  |  |  |  |  |  |  |  |  |  | 154 | 158 |
|  |  |  |  |  |  |  |  |  |  |  | (25) | 158 | 162 |
|  |  |  |  |  |  |  |  |  |  |  |  |  | 166 |
|  |  |  |  |  |  |  |  |  |  |  |  | (27) | 170 |
|  |  |  |  |  |  |  |  |  |  |  |  |  | (29) | to FIG.20B →

| 4.0 N | 4.0 O | 4.0 P | 4.0 Q | 4.0 R | 4.0 S | 4.0 T | 4.0 U | 4.0 V | 4.0 W | Fortran | Hexidecimal Code H | Octal Code I |
|---|---|---|---|---|---|---|---|---|---|---|---|---|
| 62 | 66 | 70 | 74 | 78 | 82 | 86 | 90 | 94 | 98 | 0 | 0 | 0 |
| 66 | 70 | 74 | 78 | 82 | 86 | 90 | 94 | 98 | 102 | 1 | 1 | 1 |
| 70 | 74 | 78 | 82 | 86 | 90 | 94 | 98 | 102 | 106 | 2 | 2 | 2 |
| 74 | 78 | 82 | 86 | 90 | 94 | 98 | 102 | 106 | 110 | 3 | 3 | 3 |
| 78 | 82 | 86 | 90 | 94 | 98 | 102 | 106 | 110 | 114 | 4 | 4 | 4 |
| 82 | 86 | 90 | 94 | 98 | 102 | 106 | 110 | 114 | 118 | 5 | 5 | 5 |
| 86 | 90 | 94 | 98 | 102 | 106 | 110 | 114 | 118 | 122 | 6 | 6 | 6 |
| 90 | 94 | 98 | 102 | 106 | 110 | 114 | 118 | 122 | 126 | 7 | 7 | 7 |
| 94 | 98 | 102 | 106 | 110 | 114 | 118 | 122 | 126 | 130 | 8 | 8 | 8 |
| 98 | 102 | 106 | 110 | 114 | 118 | 122 | 126 | 130 | 134 | 9 | 9 | 9 |
| 102 | 106 | 110 | 114 | 118 | 122 | 126 | 130 | 134 | 138 | A | A | 10 |
| 106 | 110 | 114 | 118 | 122 | 126 | 130 | 134 | 138 | 142 | B | B | 11 |
| 110 | 114 | 118 | 122 | 126 | 130 | 134 | 138 | 142 | 146 | C | C | 12 |
| 114 | 118 | 122 | 126 | 130 | 134 | 138 | 142 | 146 | 150 | D | D | 13 |
| 118 | 122 | 126 | 130 | 134 | 138 | 142 | 146 | 150 | 154 | E | E | 14 |
| 122 | 126 | 130 | 134 | 138 | 142 | 146 | 150 | 154 | 158 | F | F | 15 |
| 126 | 130 | 134 | 138 | 142 | 146 | 150 | 154 | 158 | 162 | G | | 16 |
| 130 | 134 | 138 | 142 | 146 | 150 | 154 | 158 | 162 | 166 | H | | 17 |
| 134 | 138 | 142 | 146 | 150 | 154 | 158 | 162 | 166 | 170 | I | | |
| 138 | 142 | 146 | 150 | 154 | 158 | 162 | 166 | 170 | 174 | J | | |
| 142 | 146 | 150 | 154 | 158 | 162 | 166 | 170 | 174 | 178 | K | | |
| 146 | 150 | 154 | 158 | 162 | 166 | 170 | 174 | 178 | 182 | L | | |
| 150 | 154 | 158 | 162 | 166 | 170 | 174 | 178 | 182 | 186 | M | | |
| 154 | 158 | 162 | 166 | 170 | 174 | 178 | 182 | 186 | 190 | N | | |
| 158 | 162 | 166 | 170 | 174 | 178 | 182 | 186 | 190 | 194 | O | | |
| 162 | 166 | 170 | 174 | 178 | 182 | 186 | 190 | 194 | 198 | P | | |
| 166 | 170 | 174 | 178 | 182 | 186 | 190 | 194 | 198 | 202 | Q | | |
| 170 | 174 | 178 | 182 | 186 | 190 | 194 | 198 | 202 | 206 | R | | |
| 174 | 178 | 182 | 186 | 190 | 194 | 198 | 202 | 206 | 210 | S | | |
| 178 | 182 | 186 | 190 | 194 | 198 | 202 | 206 | 210 | 214 | T | | |
| 182 | 186 | 190 | 194 | 198 | 202 | 206 | 210 | 214 | 218 | U | | |
| | 190 | 194 | 198 | 202 | 206 | 210 | 214 | 218 | 222 | V | | |
| (31) | 194 | 198 | 202 | 206 | 210 | 214 | 218 | 222 | 226 | W | | |
| | | 202 | 206 | 210 | 214 | 218 | 222 | 226 | 230 | X | | |
| | (33) | 206 | 210 | 214 | 218 | 222 | 226 | 230 | 234 | Y | | |
| | | | 214 | 218 | 222 | 226 | 230 | 234 | 238 | Z | | |
| | | (35) | 218 | 222 | 226 | 230 | 234 | 238 | 242 | . | | |
| | | | | 226 | 230 | 234 | 238 | 242 | 246 | , | | |
| | | | (37) | 230 | 234 | 238 | 242 | 246 | 250 | = | | |
| | | | | | 238 | 242 | 246 | 250 | 254 | + | | |
| | | | | (39) | 242 | 246 | 250 | 254 | 258 | - | | |
| | | | | | | 250 | 254 | 258 | 262 | $ | | |
| | | | | | (41) | 254 | 258 | 262 | 266 | / | | |
| | | | | | | | 262 | 266 | 270 | ( | | |
| | | | | | | (43) | 266 | 270 | 274 | ) | | |
| | | | | | | | | 274 | 278 | # | | |
| | | | | | | | (45) | 278 | 282 | | | |
| | | | | | | | | | 286 | | | |
| | | | | | | | | (47) | 290 | | | |
| | | | | | | | | | (49) | | | | to FIG.20A

FIG.21A

|  |  |  |  |  |  |  |  |  | Fortran | Hexidecimal | Octal |
|---|---|---|---|---|---|---|---|---|---|---|---|
| 2.0 | 2.0 | 2.0 | 2.0 | 2.0 | 2.0 | 2.0 | 2.0 | 2.0 |  | Code | Code |
| N | O | P | Q | R | S | T | U | V | W |  | H | I |
| 31 | 33 | 35 | 37 | 39 | 41 | 43 | 45 | 47 | 49 | 0 | 0 | 0 |
| 33 | 35 | 37 | 39 | 41 | 43 | 45 | 47 | 49 | 51 | 1 | 1 | 1 |
| 35 | 37 | 39 | 41 | 43 | 45 | 47 | 49 | 51 | 53 | 2 | 2 | 2 |
| 37 | 39 | 41 | 43 | 45 | 47 | 49 | 51 | 53 | 55 | 3 | 3 | 3 |
| 39 | 41 | 43 | 45 | 47 | 49 | 51 | 53 | 55 | 57 | 4 | 4 | 4 |
| 41 | 43 | 45 | 47 | 49 | 51 | 53 | 55 | 57 | 59 | 5 | 5 | 5 |
| 43 | 45 | 47 | 49 | 51 | 53 | 55 | 57 | 59 | 61 | 6 | 6 | 6 |
| 45 | 47 | 49 | 51 | 53 | 55 | 57 | 59 | 61 | 63 | 7 | 7 | 7 |
| 47 | 49 | 51 | 53 | 55 | 57 | 59 | 61 | 63 | 65 | 8 | 8 | 8 |
| 49 | 51 | 53 | 55 | 57 | 59 | 61 | 63 | 65 | 67 | 9 | 9 | 9 |
| 51 | 53 | 55 | 57 | 59 | 61 | 63 | 65 | 67 | 69 | A | A | 10 |
| 53 | 55 | 57 | 59 | 61 | 63 | 65 | 67 | 69 | 71 | B | B | 11 |
| 55 | 57 | 59 | 61 | 63 | 65 | 67 | 69 | 71 | 73 | C | C | 12 |
| 57 | 59 | 61 | 63 | 65 | 67 | 69 | 71 | 73 | 75 | D | D | 13 |
| 59 | 61 | 63 | 65 | 67 | 69 | 71 | 73 | 75 | 77 | E | E | 14 |
| 61 | 63 | 65 | 67 | 69 | 71 | 73 | 75 | 77 | 79 | F | F | 15 |
| 63 | 65 | 67 | 69 | 71 | 73 | 75 | 77 | 79 | 81 | G |  | 16 |
| 65 | 67 | 69 | 71 | 73 | 75 | 77 | 79 | 81 | 83 | H |  | 17 |
| 67 | 69 | 71 | 73 | 75 | 77 | 79 | 81 | 83 | 85 | I |  |  |
| 69 | 71 | 73 | 75 | 77 | 79 | 81 | 83 | 85 | 87 | J |  |  |
| 71 | 73 | 75 | 77 | 79 | 81 | 83 | 85 | 87 | 89 | K |  |  |
| 73 | 75 | 77 | 79 | 81 | 83 | 85 | 87 | 89 | 91 | L |  |  |
| 75 | 77 | 79 | 81 | 83 | 85 | 87 | 89 | 91 | 93 | M |  |  |
| 77 | 79 | 81 | 83 | 85 | 87 | 89 | 91 | 93 | 95 | N |  |  |
| 79 | 81 | 83 | 85 | 87 | 89 | 91 | 93 | 95 | 97 | O |  |  |
| 81 | 83 | 85 | 87 | 89 | 91 | 93 | 95 | 97 | 99 | P |  |  |
| 83 | 85 | 87 | 89 | 91 | 93 | 95 | 97 | 99 | 101 | Q |  |  |
| 85 | 87 | 89 | 91 | 93 | 95 | 97 | 99 | 101 | 103 | R |  |  |
| 87 | 89 | 91 | 93 | 95 | 97 | 99 | 101 | 103 | 105 | S |  |  |
| 89 | 91 | 93 | 95 | 97 | 99 | 101 | 103 | 105 | 107 | T |  |  |
| 91 | 93 | 95 | 97 | 99 | 101 | 103 | 105 | 107 | 109 | U |  |  |
|  | 95 | 97 | 99 | 101 | 103 | 105 | 107 | 109 | 111 | V |  |  |
| (31) | 97 | 99 | 101 | 103 | 105 | 107 | 109 | 111 | 113 | W |  |  |
|  |  | 101 | 103 | 105 | 107 | 109 | 111 | 113 | 115 | X |  |  |
|  | (33) | 103 | 105 | 107 | 109 | 111 | 113 | 115 | 117 | Y |  |  |
|  |  |  | 107 | 109 | 111 | 113 | 115 | 117 | 119 | Z |  |  |
|  |  | (35) | 109 | 111 | 113 | 115 | 117 | 119 | 121 | . |  |  |
|  |  |  |  | 113 | 115 | 117 | 119 | 121 | 123 | , |  |  |
|  |  |  | (37) | 115 | 117 | 119 | 121 | 123 | 125 | = |  |  |
|  |  |  |  | 119 | 121 | 123 | 125 | 127 | + |  |  |  |
| to |  |  |  | (39) | 121 | 123 | 125 | 127 | 129 | − |  |  |
| FIG.21A |  |  |  |  | 125 | 127 | 129 | 131 | $ |  |  |  |
|  |  |  |  | (41) | 127 | 129 | 131 | 133 | / |  |  |  |
|  |  |  |  |  | 131 | 133 | 135 | ( |  |  |  |  |
|  |  |  |  |  | (43) | 133 | 135 | 137 | ) |  |  |  |
|  |  |  |  |  |  | 137 | 139 | # |  |  |  |  |
|  |  |  |  |  | (45) | 139 | 141 |  |  |  |  |  |
|  |  |  |  |  |  |  | 143 |  |  |  |  |  |
|  |  |  |  |  |  | (47) | 145 |  |  |  |  |  |
|  |  |  |  |  |  |  | (49) |  |  |  |  |  |

|  | PRIOR ART | THIS INVENTION |
|---|---|---|
| CLOCK CYCLE TIME | 8.2 N/Seconds | 2.5 N/Seconds |
| INPUT-OUTPUT RATES $$\frac{1}{8.5 \times 10^{-9}}$$ Equals Bits Per/Sec. $$\frac{\text{Bits Per/Second}}{10 \text{ Bits}}$$ Equals Characters Per/Sec. | 117,647.058.00 Bits Per/Second<br><br>11,764,705.80 Characters Per/Second | 400,000,000.00 Bits Per/Second<br><br>40,000,000.00 Bits Per/Second |
| HIGH-SPEED EXTERNAL CHANNEL-FULL DUPLEX POINT-TO-POINT COMMUNICATIONS | 25,000,000.00 Bits Per/Second<br><br>2,500,000.00 Characters Per/Sec<br><br>Up to 70 feet<br><br>32 wire connection | 400,000,000.00 Bits Per/Second<br><br>40,000,000.00 Characters Per/Sec<br><br>Up to 600 feet<br><br>2 wire connection |
| CENTRAL MEMORY BANK CYCLE TIME | 34.0 N/Seconds | 2.5 N/Seconds |
| MEMORY SEEK TIME | 16 Milliseconds | 250 Microseconds |

FIG.22A

| | | |
|---|---|---|
| MEMORY CAPACITY | | |
| ECL | 4,8 or 16 Million 64 Bit Words | Designed to customer requirements |
| SSD | 512 Million Words (4096) M/Bytes Per/Second | The use of One Bit to process One Character allows this system to store up to 16 times more data using the same type of memory storage modules and disk drive units, or use less storge modules and disk drives, depending on customer specifications. |
| PHYSICAL SIZE | 90 Sq. Ft. floor space required. Not including cooling and electrical support equipment | Basic computer: 6" x 8" x 2" With CRT, keyboard and disk drive accessories, approximately the size of a standard personal computer. |
| COOLING SUPPORT EQUIPMENT | Freon based, through 270° arch pillars, etc. | None required: the heat associated with 16, 32 and 64 bits is eliminated, due to the use of One Bit to process One Character. |

FIG.22B

DATA ACQUISITION SENSOR AND METHOD OF SIGNALING

REFERENCE TO RELATED PATENT AND APPLICATIONS

This is an improvement on the system of U.S. Pat. No. 4,188,581 a copy of which is attached hereto and incorporated on its entirety by reference.

This application is a non provisional application based upon Provisional Patent Application 60/074,267 filed Feb. 10, 1998 the benefit of which is claimed.

BACKGROUND OF THE INVENTION

The synchronous methods presently employed in data communications generally and in particular computer communications are under the control of a clock generator or timer. Evasive means are employed in countering interference which is major concern. High-speed computer systems have their upper limits set on performance but their potential is impeded by delays. This is due in part to the necessity of binary coding of alphanumerics. To transmit, receive, store, decode and convert a long train of bits, includes the problems of framing, synchronization, debugging and parity check (all associated with the present synchronous systems). These problems relating to efficiency and control remain unsolved.

The development of reliable communications have been retarded to a large extend by different forms of interference. Present systems rely mainly on evasive means of countering interference. Added circuitry and component parts represent further delays and the evasive methods used are not always an acceptable alternative.

The number of central processing units (CPU's) being manufactured continues to increase and many are different and incompatible with each other. This effects an area of technology which would otherwise support portability and compatibility of encoded data.

The communication link between computer systems must be provided with an interface which will provide all systems portability and data exchange compatibility with efficiency and control at the highest degree, free from all extraneous signal interference.

This document describes the concepts developed for such an interface. Included are character and digit coded logic (universal language codes).

Several different attempts have been tried to produce asynchronous data transmission systems in which each character is encoded as a single waveform or pulse duration Prior Art U.S. Pat. No. 4,584,691 Herr Apr. 22, 1986
Pulse length modulation system in which detection is accomplished by gating a stable local oscillator and detecting the character or numeral using a cycle counter for the local oscillator.

U.S. Pat. No. 5,661,758 M. E. Long Aug. 26, 1997
The patent discloses a method of encoding in which distinct disruptions are selected for each character of data and introduced on a carrier. The start time and duration of the disruption represent the character encoded.

U.S. Pat. No. 5,588,023 K. F. Ho Dec. 24, 1996
A system for transmitting data employing half cycle wavelength. Information is carried in the duration of the wavelength. A wave duration circuit is disclosed in FIG. 111 as employing a switch, a flip flop, a decoder, a 15 bit counter and a 16 bit latch. And active differentiator is disclosed in FIG. 14. The foregoing prior art issued since U.S. Pat. No. 4,188,581 of this invention recognizes the value of one unique pulse or waveform per pulse as an efficient form of data transmission. A schematic of the sensor (outlined) and a proposed schematic for the "active" section are shown.

BRIEF DESCRIPTION OF THE INVENTION

This is an improvement upon the Signaling System of the U.S. Pat. No. 4,188,581 of this inventor issued Feb. 12, 1980 and involves the design and features of a new computer interface based upon this prior patent. A copy thereof is attached hereto and is incorporated in its entirety by reference. Universal language codes and formulas developed to eliminate any ambiguous readouts are likewise disclosed. The measurements obtained from pulse parameters and the method used for detection are described.

The computer interface was designed primarily for asynchronous pulse code modulation. Pulses received as applied to the interface are rectified and of fixed duration and are sequenced in time, thereby providing the various elements of information required.

Unlike pulse width and pulse duration modulation where each has only one parameter measurement, in pulse code modulation there are three measurements per character, each character being different. Amplitude is not a parameter of concern. For a more complete understanding of pulse code modulation reference should be made to Oppenheimer and Willsky, Published by Prentice Hall, Inc. SIGNALS AND SYSTEMS©1997.

The method of coding and decoding alphanumerics expands the interface systems range with a "bank of codes" vocabulary. There are five Banks of Codes. Code Bank#1, for example has 23 individual codes lettered "A" through "W". Each code increases in number and digit length, extending from common Binary to the $46^{th}$ character of the Fortran IV code of alphanumerics.

The 23 codes marked "A" through "W" can be combined into a series of 621 single digit byte instructions by switching from one code to another, or codes can be selected individually by the number of instructions required.

The receiving system of this invention typically includes an input stage such as a receiving antenna input device, followed by an asynchronous wide-band receiver in which output is heterodyned through a down converter by a stabilized oscillator. The output of the converter is applied to a wide-bank I.F. (intermediate frequency) amplifier and precedes to an envelope detector for rectification.

A data acquisition sensor section of the computer interface is basically passive and soli state having linear characteristics. It is capable of use with either low or high level signals and requires no synchronization.

A highly selective anti jamming demultiplexer is also disclosed which is an improvement of the system of U.S. Pat. No. 4,188,581 of R. A. Stevenson. The code demultiplexer is also designed for counter measures as an anti-jam device.

A demultiplexer is employed including a transmission line which is terminated in a reflective termination. The transmission line has a plurality of taps, each related in position to detect a particular alphanumerica encoded pulse. Each tap is spaced from the termination distance related to one half of a discrete pulse length in terms of its propagation rate down the medium. Diodes are associated with each tap and are connected to the logic gates for the system. For the Code Bank#1, the total length of the line is 120 nanoseconds, which allows for detection of pulse lengths from 10 N/Sec. to 240 N/Sec.

The improvements to the demultiplexer of this invention over U.S. Pat. No. 4,188,581, include:
1. the presence a differentiator circuit; and
2. A high speed diode—D1.

The differeniator circuit consists of a network of resistors and a capacitor, followed by a high-speed diode. The diode is forward biased by the positive leading edge of the differentiated pulse and conducts. The diode is reversed biased by the negative trailing edge of the same pulse and acts as a very high impedance or open circuit gate, thereby preventing any premature triggering of following logic gates where negative signals might exceed the logic gate thresholds. The prior art is believed to lack this feature and result.

The positive leading edge of the differentiated pulse and the trailing open circuit gate conduct down the demultiplexer line towards the low impedance ground. Upon reaching ground, the positive leading edge reverses polarity and direction. This negative reflective signal and the incident pulse open circuit gate, each traveling at approximately the speed of light, pass the demultiplexer tap simultaneously, from opposite directions, providing an output pulse with a approximately 50% reduction in duration, rise time and fall time, denoting a detected character.

As shown in the drawings to follow, the demultiplexer taps marked "A" through "W" are the START pulses and represent the 23 individual codes in the code bank. Each START pulse is used to identify the code to be processed and may also provide spacing for bytes and words, and provide synchronization to computer subsystems.

Following the START pulses is the data from the tap marked "A" ("A prime"). For Code Bank#1 the data pulses are of a fixed duration, e.g. increments of 10 N/Sec., and in one embodiment are spaced apart in time representing the various characters in the code. The taps constitute the detection point for the first and second parameters of each character and represent the measurement of duration of a first and second pulse representing each character.

The signals detected at each tap are transferred to a decoder, where each character is detected by the measurement of a third parameter. Parameter 3 is the time measurement between the parameters 1 and 2. The start and the signals detected from the third measurements are transferred through the logic gates and data bus to the computer for conversion into machine code, storage and processing.

In a second embodiment there is no space between characters unless installed as described above. The detected trailing edge of the first pulse is the beginning of the first character, the trailing edge of the second pulse is the end of the first character and the beginning of the second character. The trailing edge of the third pulse is the end of the second character and the beginning of the third character, etc.

Character recognition is accomplished when the leading parameter 1 of one signal is present at a logic gate tap at the same instant that a parameter 2 signal is at the decoder input. When this occurs, both signals add in amplitude. The parameter one signal at the logic gate tap will exceed the logic gate threshold sending a signal through the data bus to the computer for storage, conversion and processing.

Following the start pulse is the data from the tap marked "A" ("A prime"). For Code Bank#1 the data pulses are of fixed 10 N/Sec. difference in durations and thus are spaced apart in time representing the various characters in the code. Point "A" is the detection point for the first and second parameters of each character and represent the measurement of duration of a first and second pulse representing each character.

In addition to the coding scheme for information, the system for receiving and decoding information as described above and in more detail below is believed to constitute a truly novel data receiver and decoder.

The system by reason of the coding employed and the detection and decoding features make them both immune to pulse jamming.

BRIEF DESCRIPTION OF THE DRAWINGS

This invention may be more clearly understood with the following detailed description and by reference to the drawings of Section I of this provisional application in which:

FIG. 2 is a schematic diagram of the decoder data port for use with code banks such as the code bank of FIG. 1;

FIG. 6 is a layout diagram for FIGS. 1–5;

FIG. 10 is a circuit diagram of a single detector of the demultiplexer of FIG. 4;

FIG. 11 is a time line showing the data output of the detector of FIG. 10;

FIG. 12 is a logic network diagram employing and gates and delay units for demultiplexing data in accordance with this invention of FIGS. 1–5;

FIG. 13 is a logic diagram for the demultiplexer of FIG. 12;

FIG. 14 is a truth table for the demultiplexer of FIG. 4;

FIG. 16 is a time line diagram of the output of decoder of FIG. 2;

FIGS. 17 through 21 are five different code banks, each with different standard time duration for different characters;

FIGS. 22A and 22B are tabular comparisons of the operating characteristics of an embodiment of this invention with an industry standard high-speed computer.

DETAILED DESCRIPTION OF THE INVENTION

FIGS. 1–4 illustrate the new computer interface of this invention. Universal language codes and formulas developed and used in the interface, eliminate any ambiguous readouts. The measurements obtained from pulse parameters and the method used for the detection of alphanumerics are also disclosed.

The method of coding and decoding alphamunerics expands the interface systems range with a bank of codes vocabulary. There are five banks of codes, one of which, Code Bank#1, shown in FIG. 1 includes individual codes lettered "A" through "W". Each code increases in number and digit length, extending from common binary to the $46^{th}$ character of the Fortran IV code of alphanumerics. The 23 codes marked "A" through "W" can be combined into a series of 621 single digit byte instructions by switching from one code to another, or codes can be selected individually by the number of instructions required. These codes are selectively inputted to a decoder 40 at FIG. 20. Other banks of codes are described below in connection with FIGS. 17–21.

Figure 3:
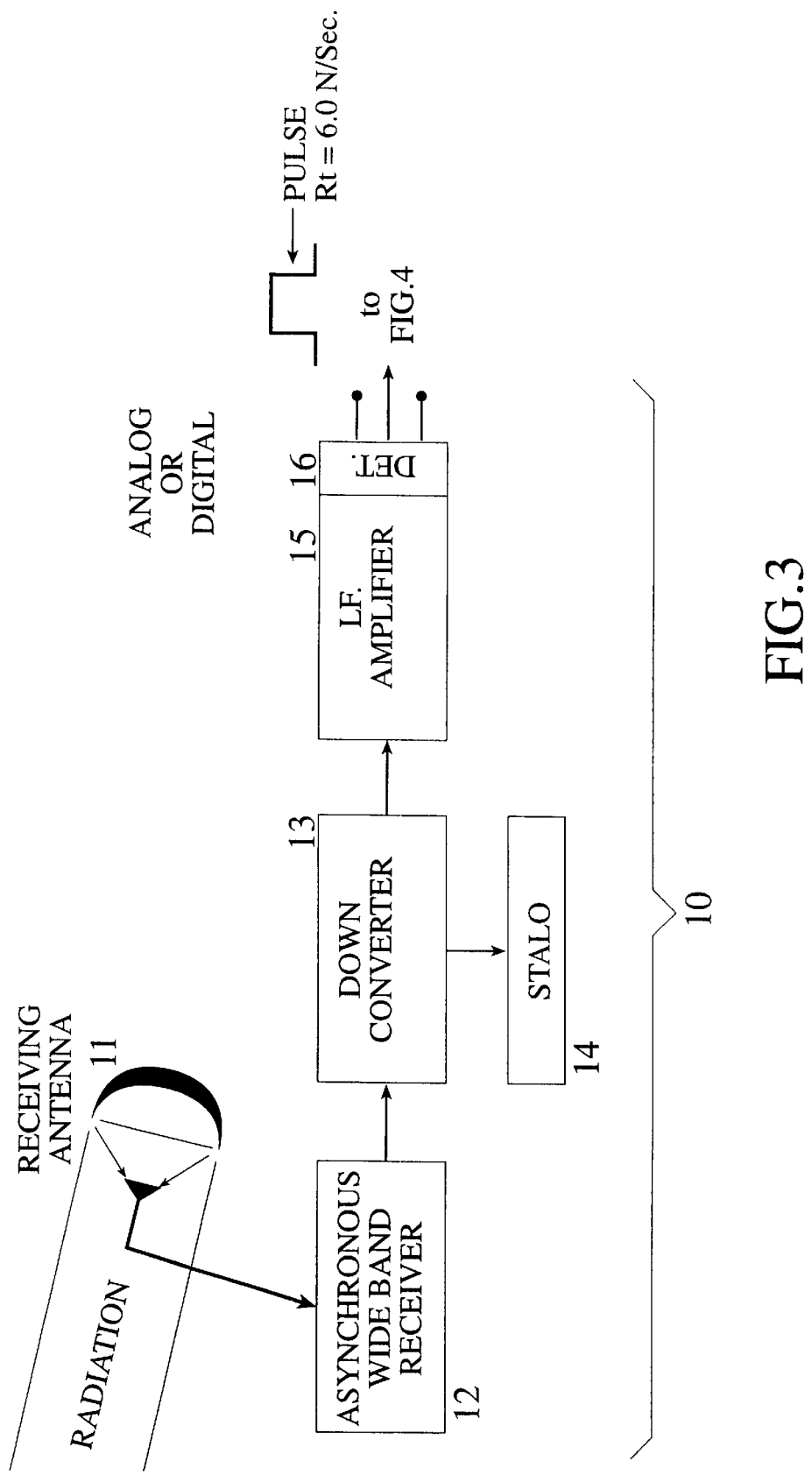
FIG. 3 is a simplified block diagram of an RF data receiving system for representing a typical source of data coded in accordance with this invention.

The receiving system shown in FIG. 3 and generally designated 10 typically includes receiving antenna 11, followed by an asynchronous wide-bank receiver 12, in which output is heterodyned through a down convertor 13, by a stabilized oscillator 14. The output of the convertor 13 is applied to a wide-band I.F. (intermediate frequency) amplifier 15, and precedes to an envelope detector 16 for rectification.

A data acquisition sensor section 20 of the computer interface shown in FIGS. of 3 and 4, is basically passive and solid-state having linear characteristics. It is capable of use with either low or high level signals and requires no synchronization.

Figure 4:
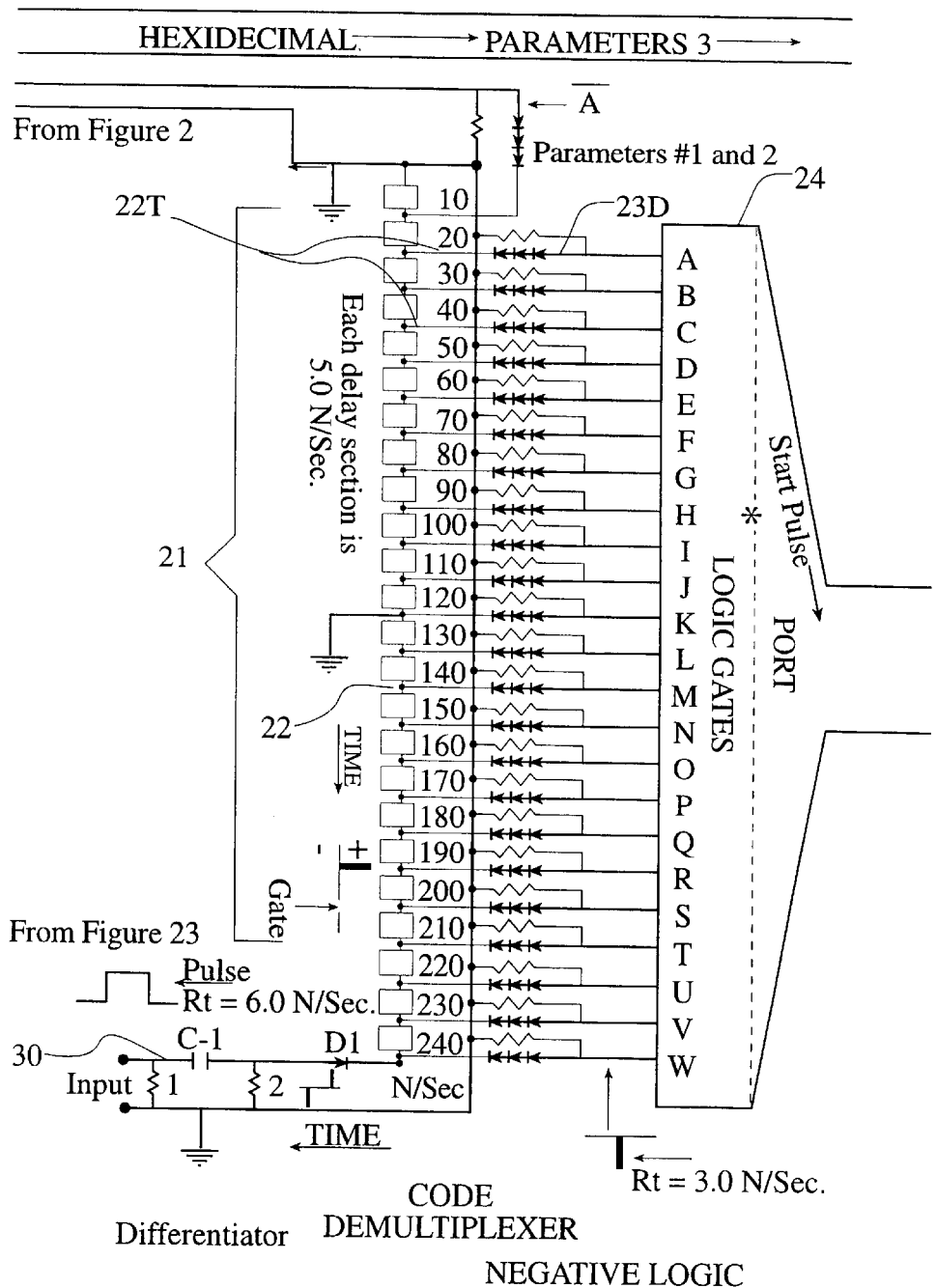
FIG. 4 is an electrical schematic diagram of the code demultiplexer, logic gates and delay line utilized in this invention.

The code demultiplexer of FIG. 4 was first designed for countermeasures as an anti jam device for radar, missile guidance and communication system applications but has now been discovered to have even greater utility in computer interface applications.

The demultiplexer 21 employs a transmission line 22 which is terminated in a reflective termination. The transmission line 22 has a plurality of taps 22T, each related in position to detect a particular alphanumeric encoded pulse. Each tap 22T is spaced from the termination by a distance related to one half of a discrete pulse length in terms of its propagation rate down the medium e.g. 5 nsec. Diodes 23D are associated with each tap and are connected to the logic gates 24 for the system. For the Code Bank#1 of FIG. 1, the total length of the line 40 is 120 nanoseconds, which allows the detection of pulse length differences from 10 N/S to 240 N/Sec.

The most notable improvements of this system as compared with the demultiplexer of FIG. 3, U.S. Pat. No. 4,188,581 include:

1. A DIFFERENTIATOR circuit 30;
2. A HIGH SPEED DIODE—D1.

The differentiator circuit 30 consists of shunt resistors R1, R2 and a series capacitor C1. Following the differentiator circuit 30 is a high-speed diode D1. The values R1, R2 and C are selected to provide the sharp spike wave form shown in FIG. 4 next to resistor R2. The diode D1 is forward biased by the positive leading edge of the differentiated pulse and conducts. The diode D1 is reversed biased by the negative trailing edge and acts as a very high impedance or open circuit gate, thereby preventing any premature triggering of the logic gates 24 where negative signals might exceed the logic gate 24 thresholds.

The positive leading edge of the differentiated pulse and the trailing open circuit gate conduct down the demultiplexer line 22 towards the low impedance ground. Upon reaching ground, the positive leading edge reverses polarity and direction. This negative reflected signal and the incident pulse, each traveling at approximately the speed of light, pass the correct code demultiplexer tap 22T simultaneously from opposite directions, providing and output pulse with a 50% reduction in duration and rise and fall-time at the corresponding tap 22T.

Figure 1B:
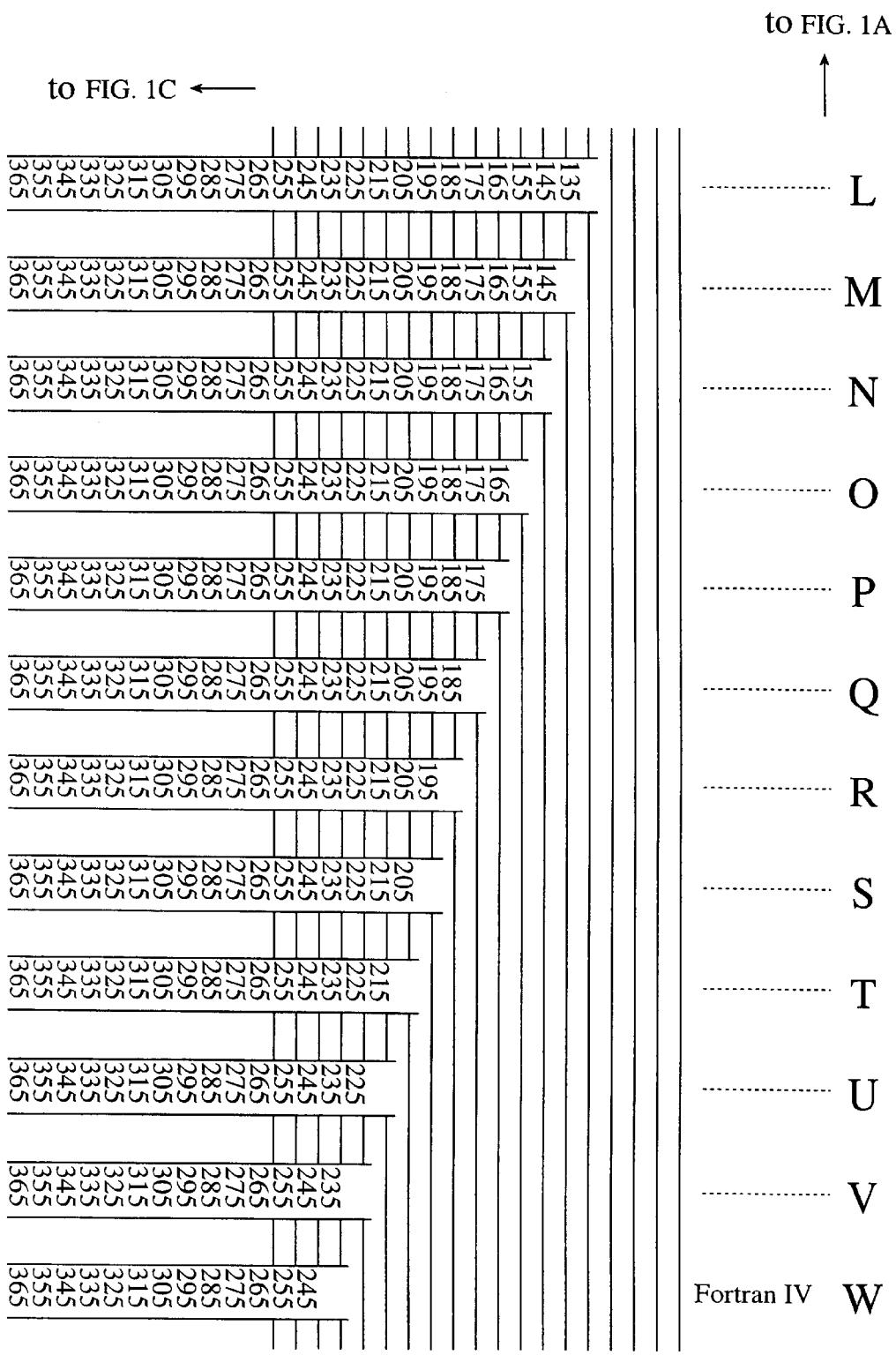
FIG. 1 is data code bank showing the relative time delays for different characters in single pulse coding or for use in hexidecimal, octal, or Fortran format as used in this invention.
Figure 1C:
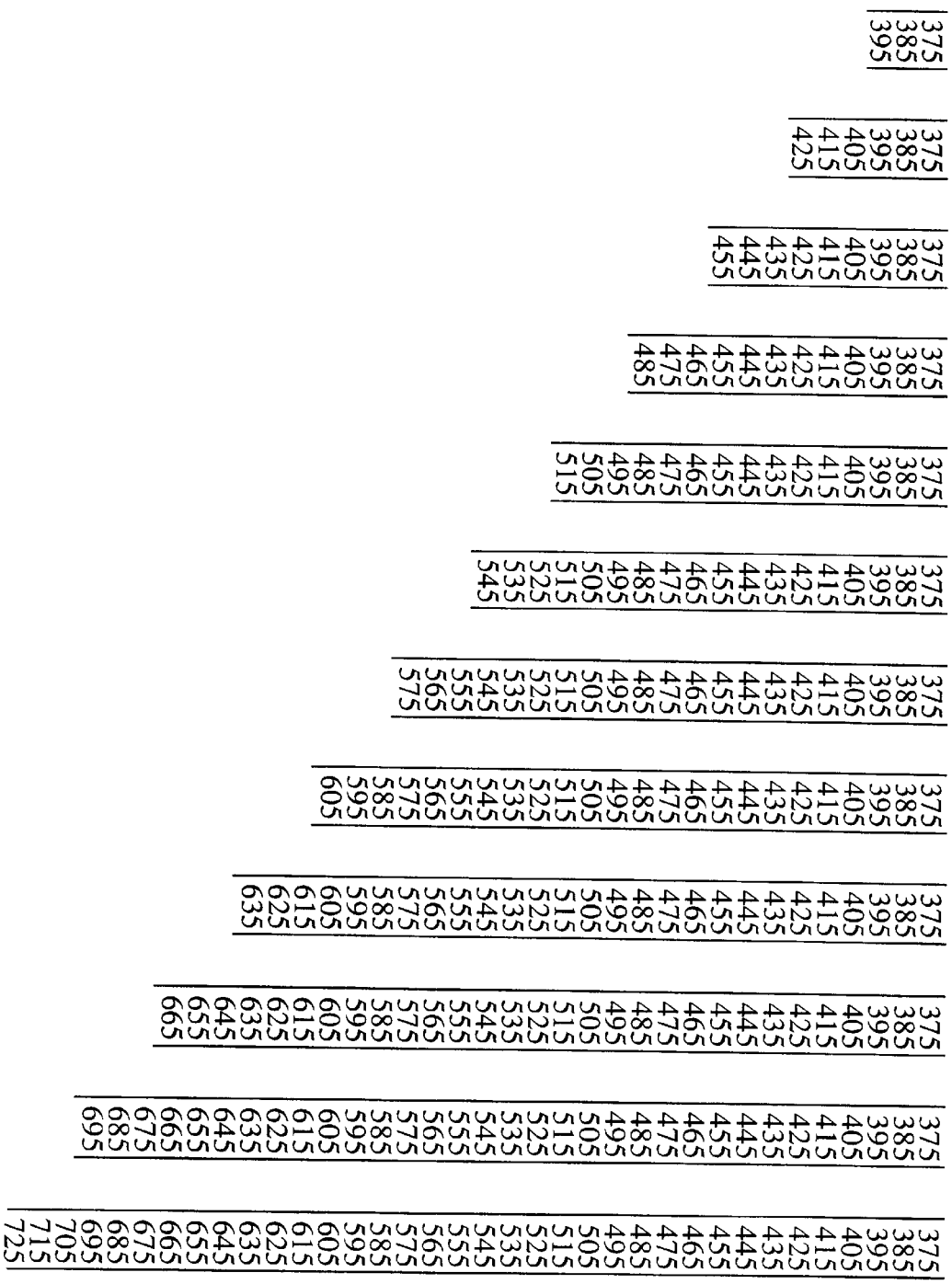
Figure 5:
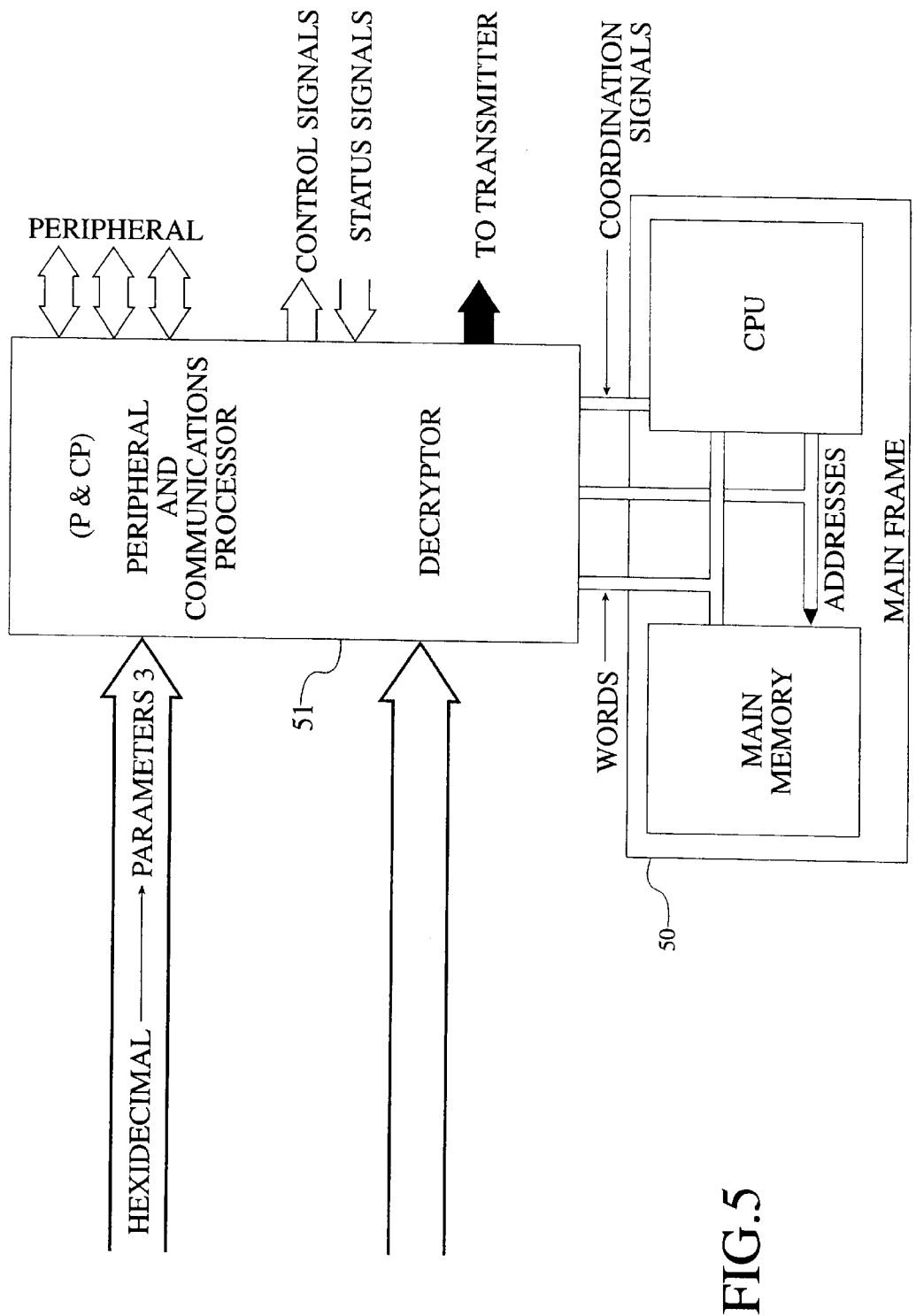
FIG. 5 is a block diagram of a typical data utilization system which can benefit by this invention.

As shown in the drawing of FIG. 1, the code demultiplexer taps marked "A" through "W" are the start pulses and represent the 23 individual code in the code-bank. Each start pulse is used to identify the code to be processed and may also provide spacing for bytes and words, and provide synchronization to the computer sub-system 50 of FIG. 5.

Following the START pulse are the data marked "A" ("A prime"). For Code Bank#1 of FIG. 1, the data pulses are of a fixed 10 N/Sec. difference in durations and are spaced apart in time representing the various characters in the code. Point "A" of FIG. 4 is the detection point for the first and second parameters of each character and represents the measurement of duration of a first and second pulse representing each character.

Figure 2:
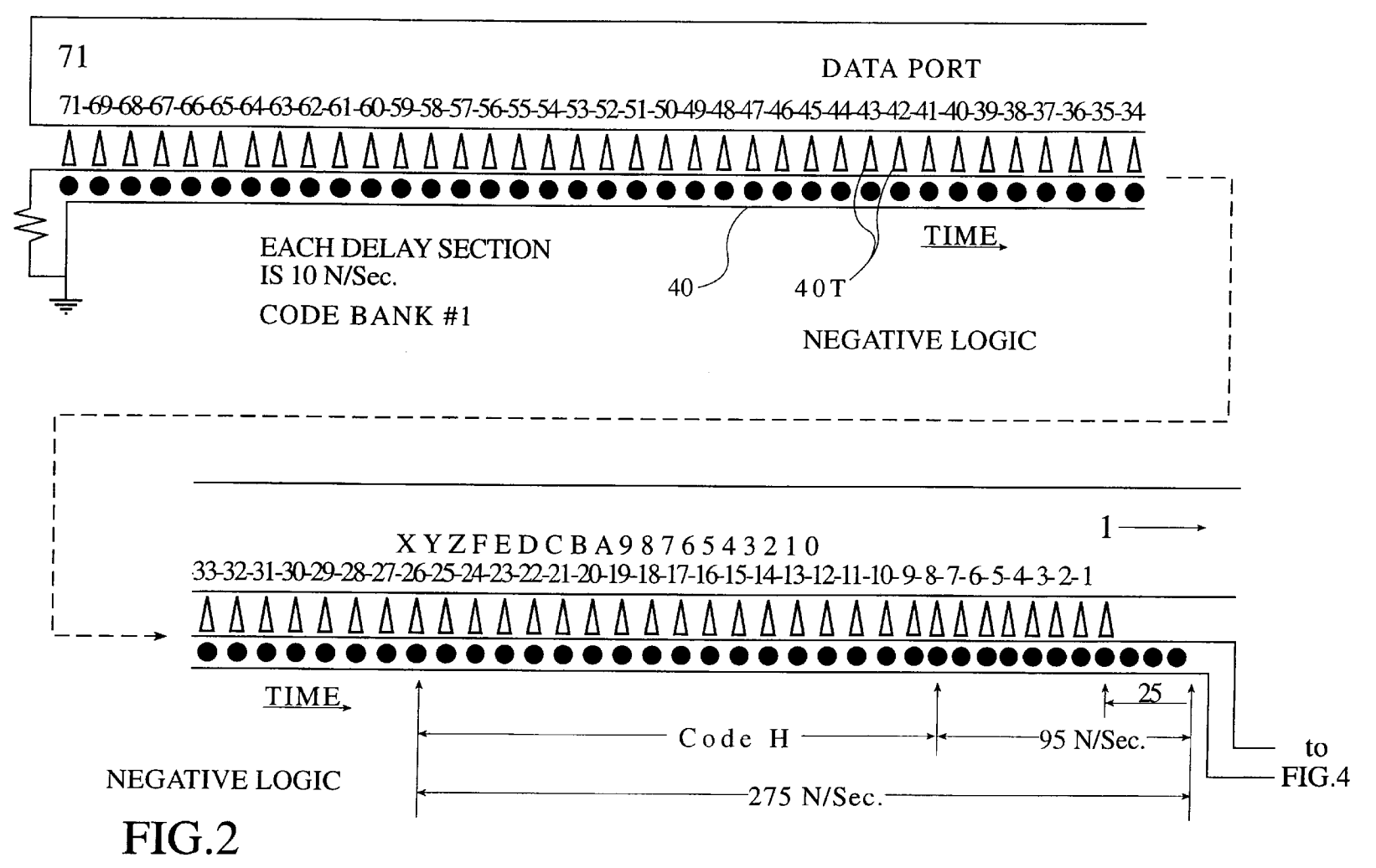

The signals detected from "A" are transferred to the decoder 40 of FIG. 2, where each character is detected by the measurement of a third parameter. Parameter 3 is the time measurement between the detected parameters 1 and 2.

There is no space between characters unless installed as described above in the preceding paragraph. The trailing edge of the first pulse, detected at "A", is the beginning of the first character, the trailing edge of the second pulse is the end of the first character and the beginning of the second character, the trailing edge of the third pulse is the end of the second character and the beginning of the third character, etc.

The following is in reference to Code "A" of Code Bank#1, shown in FIG. 1. From the input of the decoder 40 to the first tap is 25 N/Sec., representing the first character in Code A. All decoder taps 40T which follows are equally spaced 10 N/Sec. The second character of the data bank will include the time 25 N/Sec. of the first character plus 10 N/Sec. equaling 35 N/Sec. The third character will include the time of the second character plus 10 N/Sec. equaling 45 N/Sec., etc.

Character recognition is accomplished when the leading parameter 1 signal is present at a logic gate tap 24T at the same instant that a parameter 2 signal is at the decoder 40 input. When this occurs, both signals will add together in amplitude. The parameter 3 signal at the logic gate tap 40T will exceed the logic gate threshold, sending a signal through the data bus 41 to the computer 50 of FIG. 5 via peripherals and a communications processor and encriptor, which may be associated with the computer 50 for storage, conversion and processing.

Each code in the code-banks 1 through 5 may be tested for any ambiguous readouts as follows: Add any unlike measurements together, double and triple any character lengths, if the total lengths are within the code, this measurement will be evenly spaced between two logic gates. If the measurement is beyond the longest character length, then it is of no consequence.

ALTERNATIVE DECODER SUBSYSTEM

To illustrate now this coding system invention maybe utilized in combination with the features of U.S. Pat. No. 4,188,581, reference is hereby noted to FIGS. 2A–C. This diagram shows the patented system designated in FIG. 2A as the input to a decoder made up of the entire FIGS. 2A–C. The output of system 1 is introduced into a variable delay 5 to provide a delayed incoming signal to point C at the input to the decoder tapped delaying of FIG. 2B. This tapped delay line has a START/STOP incremental delay of 25 n/sec and an incremental character delay of 10 n/sec, followed by a second bank of delay sections appearing on FIG. 2C.

The input from system 1 is also introduced through a logic controlled switch 2. Upon coincidence of inputs B & D to AND Gate 7, the AND gate 7 output, after the delay controlled by variable delay 6, operate the switch 2 triggering pulse generator 3. The pulse generator 3 provides an input signal to a second '581 patented system 4. The output of system 4 at point B is introduced into delay line B–D having a START/STOP incremental delay of 50 n/sec and incremental character delay of 20 n/sec per character and per tap.

Figure 2A:
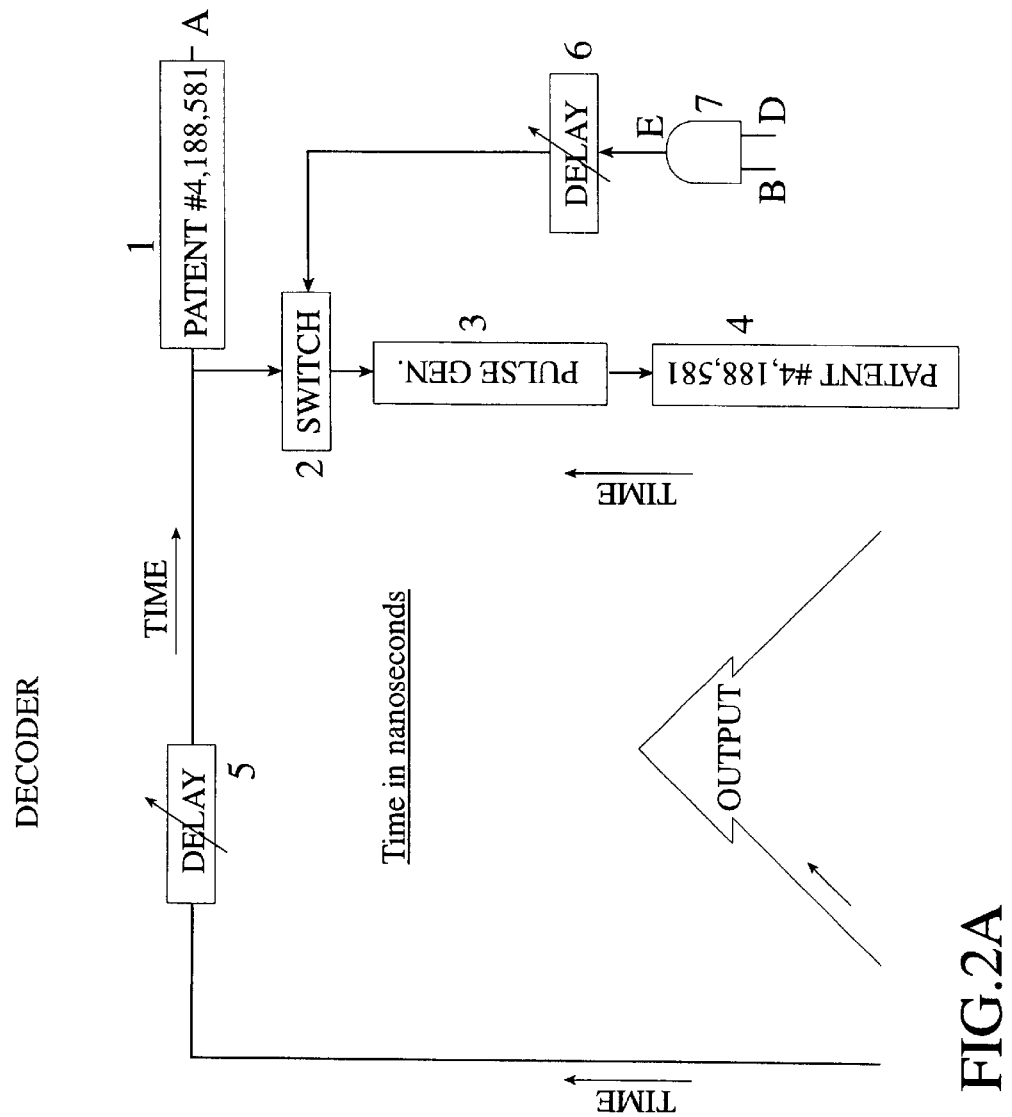
FIGS. 2A, 2B and 2C are an enlarged schematic diagram of an alternate form of decoder integrated into a data decoding subsystem.
Figure 2B:
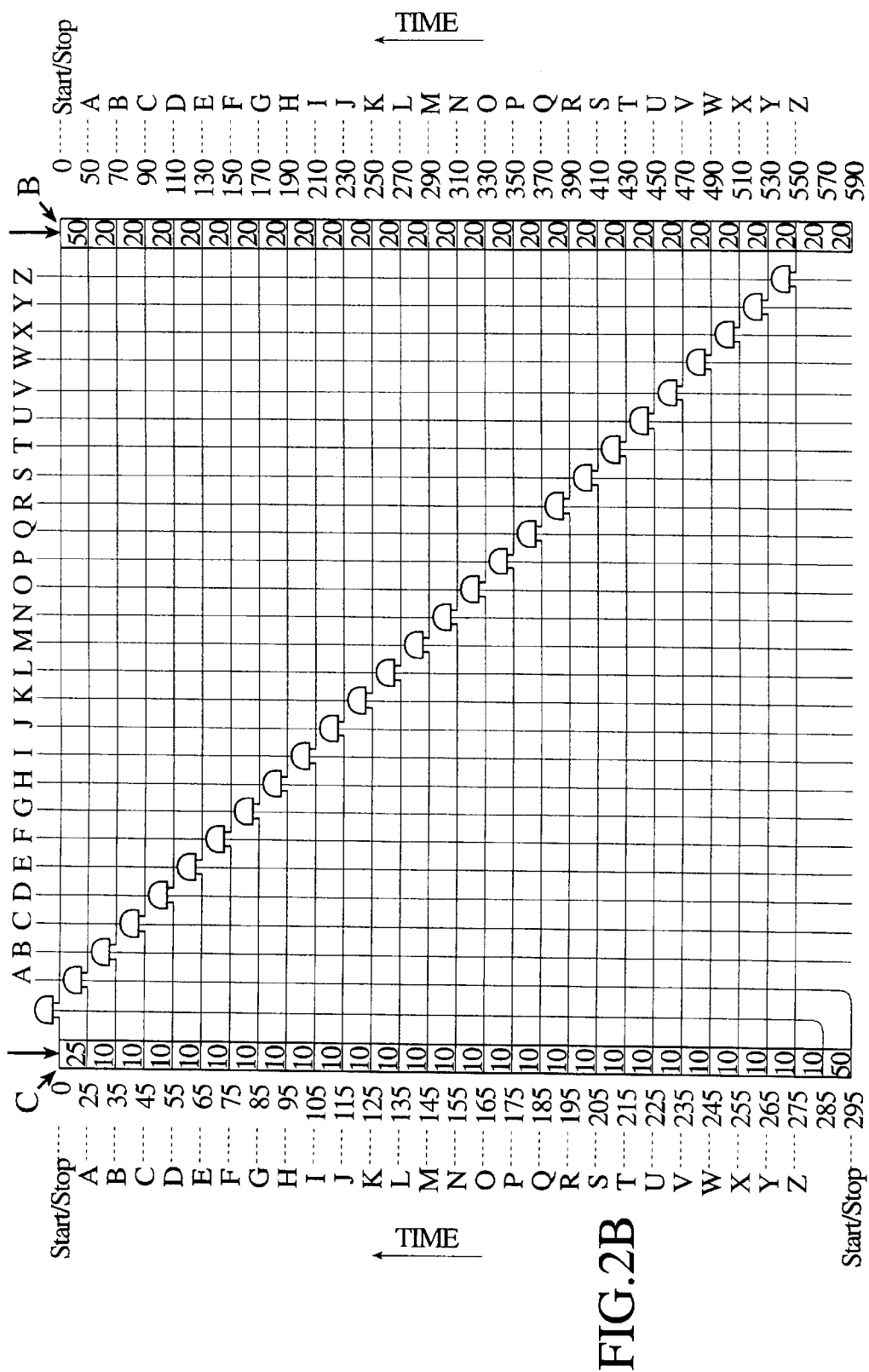
Figure 2C:
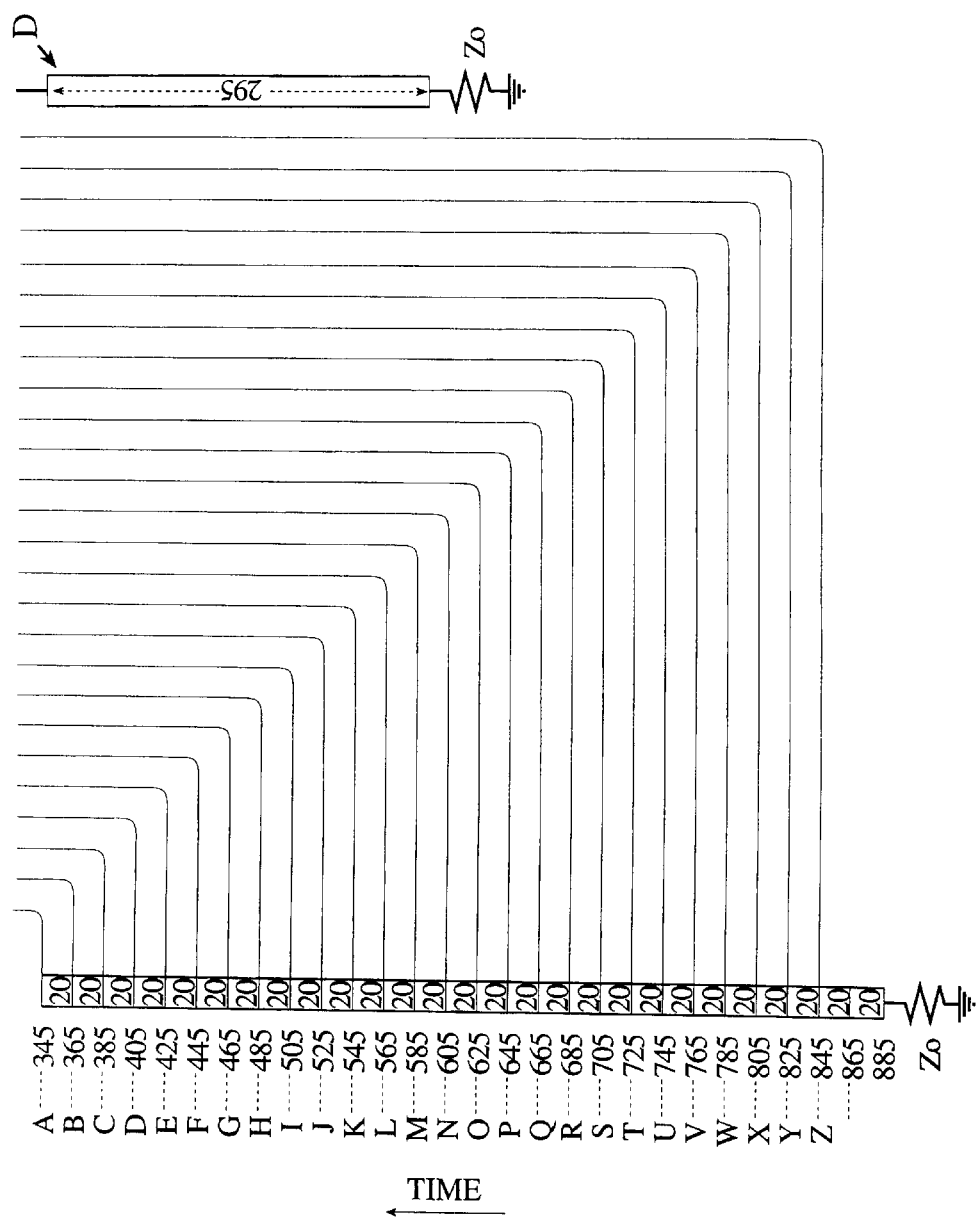

The second tapped delay line of FIG. 2C has a START/STOP incremental delay of 50 n/sec and a character incremental delay of 20 n/sec. Coincidence of the three delayed signals after a START signal constitutes a valid character which is passed to the output. Coincidence is detailed by one of the banks of AND gates of FIG. 2B. Upon coincidence the character detected in sequence constitutes the output of FIG. 2A.

JAMMING AND INTERFERENCE PROTECTION

Figure 7:
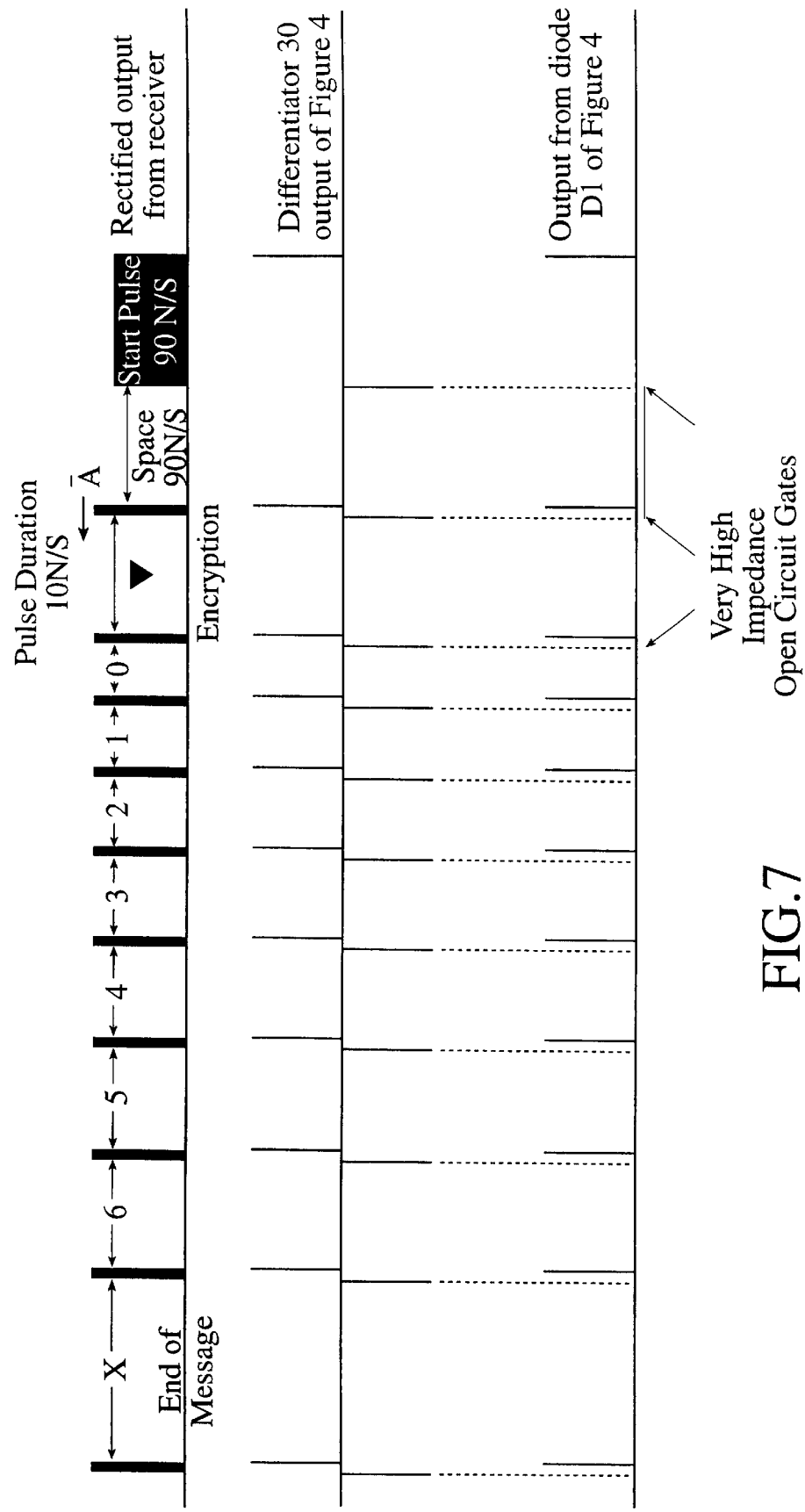
FIG. 7 is a time line representation of signals as they appear in the system of FIGS. 1–4.

The timeline of FIG. 7 illustrates the time sequence relationship between the rectified output from receiver 10 of FIG. 3 in time sequence with the differentiator 30 and diode D1 output, both of FIG. 4. It should be noted that after the differentiator 30 all pulses including the start pulse appear as sharp spikes followed by a negative spike. After the diode D1 only the positive spikes remain. The information contained in the pulse train is contained only in the two successive pulses and their time differential in predetermined increments. Thus white noise will not meet these criteria.

Figure 8:
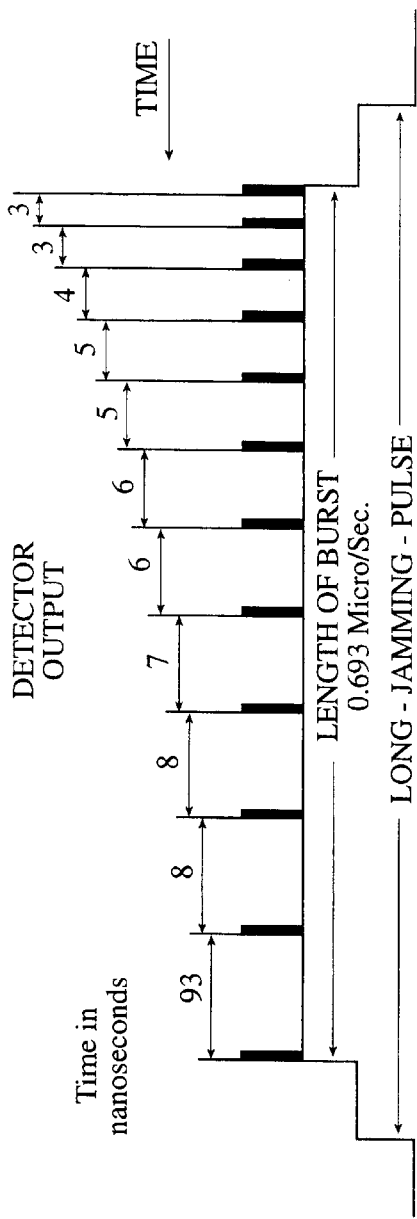
FIG. 8 is a data time line graphical representation of signals in accordance with this invention in the presence of a long duration jamming pulse interference.
Figure 9:
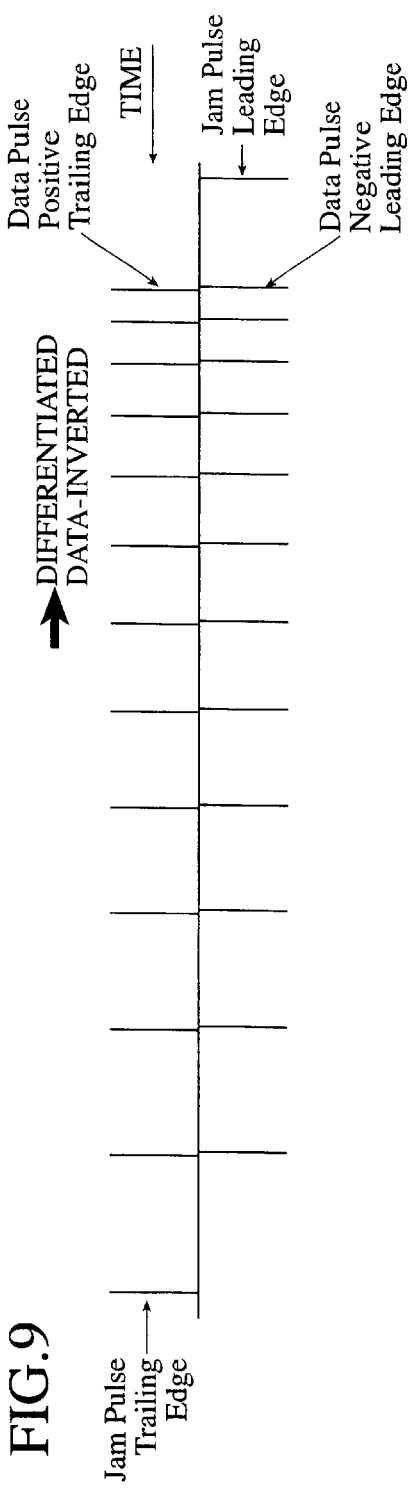
FIG. 9 is a time line corresponding to FIG. 8 after differentiation.

FIGS. 8 and 9 represent the output of the system of this invention in the presence of interference in the form of a long jamming pulse, which is present during data transmission. The data transmitted as well as the interfering pulse is differentiated as shown in FIG. 9 as having a common base line.

It should be noted that the integrity of timing and data content is not lost owing to the presence of the jamming pulse. To interfere, the jamming pulse would necessarily need to coincide in rise and fall time with the time duration of a valid digit and correspond in start time with one of the valid data pulses. If such coincidence occurs, a single digit would be lost from the data transmitted.

SINGLE STAGE DETECTOR

FIGS. 10 and 11 represent in simplified form a single detector 60 of the demultiplexer 21 including a delay line section 61 and diode 62 designed to detect each differentiated data pulse for demultiplexing. In the example given in FIGS. 10 and 1, the length of each valid data pulse is 6 n. sec. In FIG. 11, the data output from the detector of FIG. 10 consists of a coincidence signal between the differentiated negative leading edge and the data pulse positive trailing edge.

Figure 14:
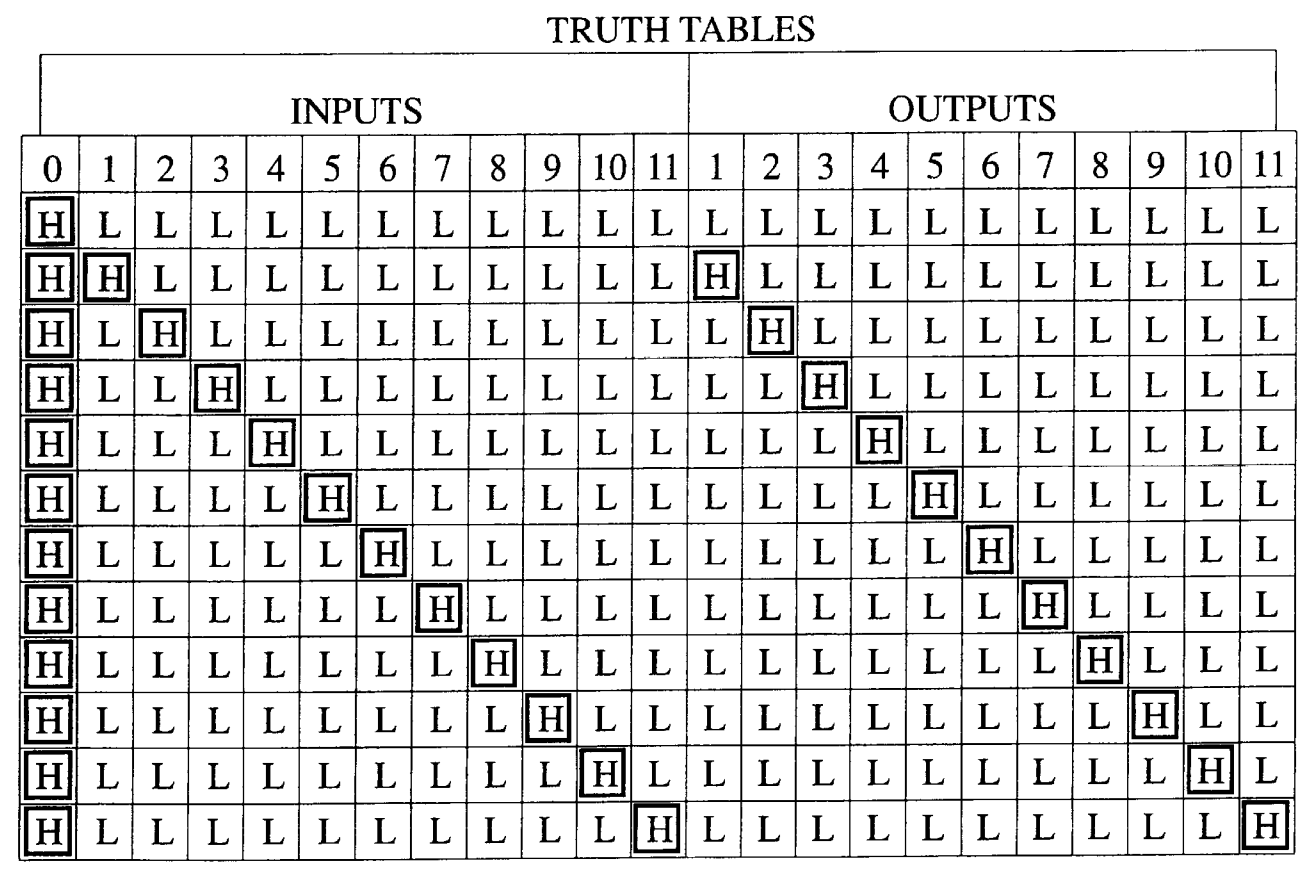

FIG. 12 represents a series of delay units 70 for demultiplexing data in combination with AND gates 71 at the output stage. The truth table of a single AND gate 71 appears in FIG. 13 and the truth table for the entire output array of outputs 1–11 along with the input appears in FIG. 14.

Figure 15:
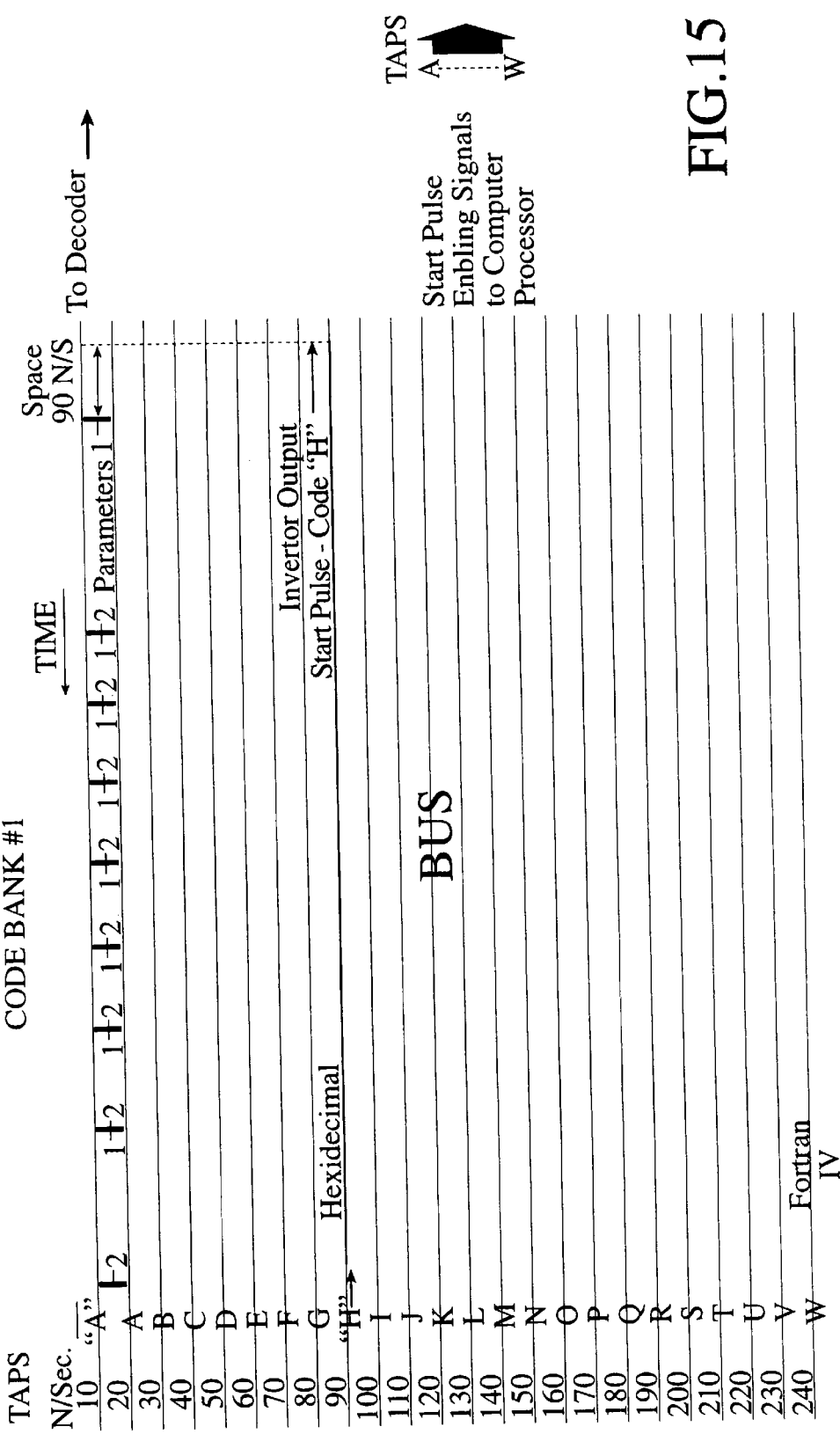
FIG. 15 is a time line of the output of the demultiplexer of FIG. 4.

The output bus timeline for the demultiplexer 21 appears in FIG. 15 while the time line for the decoder 40 of FIG. 2 is shown in FIG. 16.

Figure 20B:
Figure 21A:
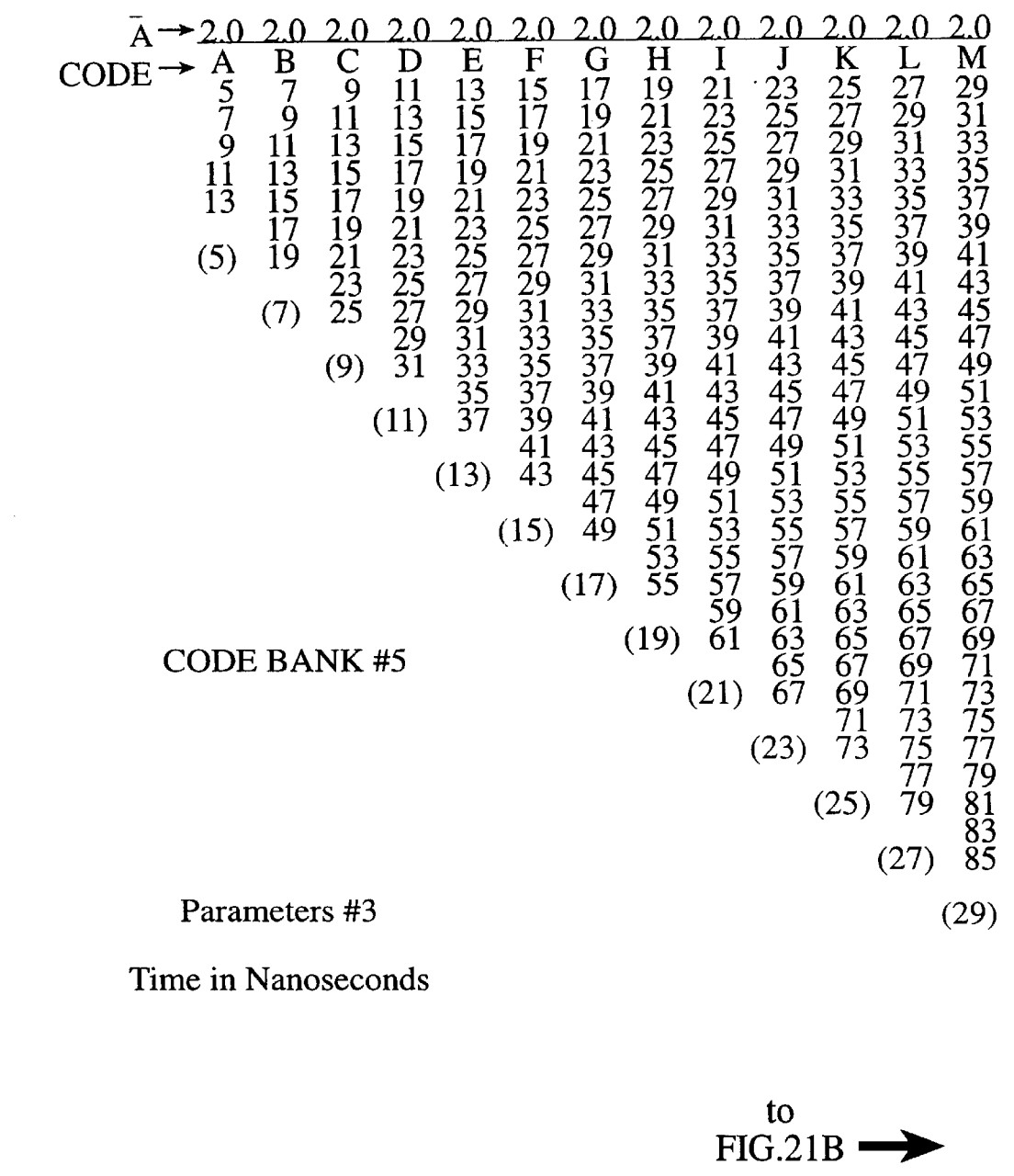
Figure 21B:

FIGS. 17 through 21 show five different code banks, each with a different time interval between characters. The time intervals are as follows:

| Code bank #1 | FIG. 17 | 10 nsec. |
| Code bank #2 | FIG. 18 | 8 nsec. |
| Code bank #3 | FIG. 19 | 6 nsec. |
| Code bank #4 | FIG. 20 | 4 nsec. |
| Code bank #5 | FIG. 21 | 2 nsec. |

FIGS. 22A and 22B are a comparison of several significant parameters of a well-known standard high speed, highly respected computer as compared with a computer system incorporating this invention.

Figure 23:
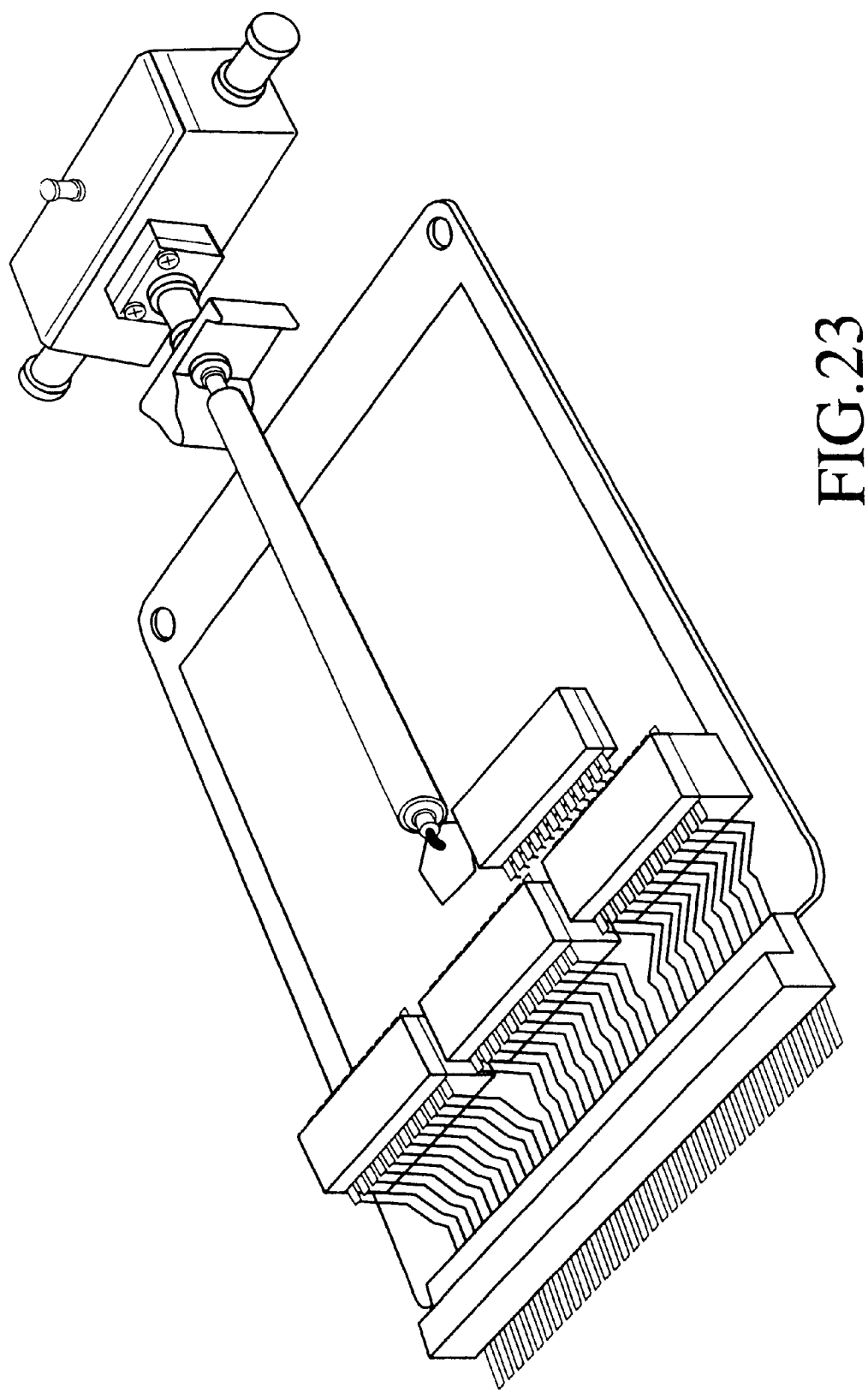
FIG. 23 is a reproduction of photograph of a prototype illustrative of this invention.

FIG. 23 is an experimental circuit board used to verify the operativeness of this invention.

ADVANTAGES OF THIS INVENTION

This system includes:
1. No input clocking network. (Asynchronous Detection)
2. No external cooling support equipment required. One Bit to process One character means far less circuitry and power required.
3. Ability to send and receive the Fortran IV alphabet, via burst transmission.
4. 3–4 times faster and greater capacity than available high-speed computer systems.
5. Up to sixteen times greater memory capacity using the same type of storage modules and disk drives. (One bit to process one character.)
6. No synchronization to send and receive data.
7. Ability to send data at a very high or low rate, asynchronously.
8. Less chance for programming errors.
9. RANGE: 5,000,000.00 to 400,000,000.00 bits per second and higher depending on the practicality of the application.
10. Immunity from most pulse jamming.
11. Relatively simple stable solid state compounds used.
12. Improved immunity form white noise jamming The above described embodiments of the present invention are merely descriptive of its principles and are not to be considered limiting. The scope of the present invention instead shall be determined from the scope of the following claims including their equivalents.

What is claimed is:
1. A coding system for data comprising;
   means for encoding data employing different incremental time durations between two successive pulses corresponding to each unique character;
   means for detecting each character including
      a transmission line with a mismatched impedance termination for reflecting each pulse, arriving at said termination;
      a plurality of taps on said transmission line delay defining of one half of the incremental time duration between the start and second pulse of any character;
      detector means coupled to each tap for detecting time coincidence between the two pulses defining a character as a detection of a character transmitted;
   the improvement therein comprising
      utilizing the second pulse of each character as the first pulse of the next succeeding character.
2. A coding system in accordance with claim 1 including a plurality of code banks each having a different standard time duration for each different character, the time duration being additive to the time duration of the next preceding character in the bank.

3. A coding system in accordance with claim 2 wherein the time duration of each of the code banks differ in a predetermined number of nanoseconds.

4. A coding system in accordance with claim 2 wherein said code banks are selectively connected to a delay line having a plurality of taps therein for decoding character information into pulse durations.

5. A coding system for data comprising;

means for generating a start pulse at the beginning of transmission of data;

means for encoding data employing the time duration between first and second pulses corresponding to a unique character;

means for detecting each character including a transmission line with a mismatched impedance termination for reflecting each pulse arriving at said termination;

means for introducing a train of encoded pulse into said transmission line;

a plurality of taps on said transmission line having a delay of one half of the time duration between the first and second pulse of each character;

detector means coupled to each tap for detecting time coincidence between the start pulse and second pulse as a detection of a character transmitted;

wherein said detectors comprise differentiator and a series connected diode.

6. A coding system in accordance with claim 5 wherein said differentiator comprises a resistance capacitance network.

7. A coding system in accordance with claim 5 wherein said diode is poled to be forward biased by a positive leading edge of a received pulse and reverse biased by a negative pulse.

8. A computer interface comprising an input stage for receiving pulse coded data having data stored in the form of the duration of time between a pair of successive pulses;

a pulse differentiator;

diode means for passing differentiated pulses of one polarity, a tapped delay line including taps at predetermined delay intervals;

a reflective termination to said tapped delay line;

a plurality of diodes for passing the resultant pulse of coincidence between the differentiated pulse from said diode after delay and the reflected pulse from said reflective termination;

a code bank;

a decoder delay line coupled to said code bank; and means coupling said decoder to said demultiplexer delay line whereby coincidence of the incident and reflected pulses provide a detected character output.

9. A computer interface in accordance with claim 8 including means coupled to said code bank delay line to output data in hexidecimal form derived from the time duration between the incident and reflected pulses.

10. A computer interface in accordance with claim 8 including multiple interchangeable code banks for changing the duration of time representative of different character.

* * * * *

UNITED STATES PATENT AND TRADEMARK OFFICE
CERTIFICATE OF CORRECTION

PATENT NO.     : 6,473,456 B1
DATED          : October 29, 2002
INVENTOR(S)    : Roy A. Stevenson et al.

It is certified that error appears in the above-identified patent and that said Letters Patent is hereby corrected as shown below:

Column 7,
Line 54, change "FIGS. 10 and 1" to -- FIGS. 10 and 11 --

Signed and Sealed this

First Day of April, 2003

JAMES E. ROGAN
*Director of the United States Patent and Trademark Office*